United States Patent
Bell et al.

(10) Patent No.: US 9,922,445 B2
(45) Date of Patent: *Mar. 20, 2018

(54) DISPLAY INTERPOSING A PHYSICAL OBJECT WITHIN A THREE-DIMENSIONAL VOLUMETRIC SPACE

(71) Applicant: PURE DEPTH LIMITED, Auckland (NZ)

(72) Inventors: Gareth Paul Bell, Auckland (NZ); Gabriel Damon Engel, Hamilton (NZ)

(73) Assignee: PURE DEPTH LIMITED (NZ)

(*) Notice: Subject to any disclaimer, the term of this patent is extended or adjusted under 35 U.S.C. 154(b) by 0 days.

This patent is subject to a terminal disclaimer.

(21) Appl. No.: 14/632,999

(22) Filed: Feb. 26, 2015

(65) Prior Publication Data

US 2016/0012630 A1 Jan. 14, 2016
US 2017/0287204 A9 Oct. 5, 2017

Related U.S. Application Data

(63) Continuation of application No. 14/192,619, filed on Feb. 27, 2014, now Pat. No. 9,721,378, which is a
(Continued)

(51) Int. Cl.
*G02F 1/1347* (2006.01)
*G02F 1/1335* (2006.01)
(Continued)

(52) U.S. Cl.
CPC .......... *G06T 15/08* (2013.01); *G02F 1/13471* (2013.01); *G02F 1/133603* (2013.01);
(Continued)

(58) Field of Classification Search
CPC .............. H01L 51/5016; H01L 51/504; H01L 51/5012; H01L 51/5281; H01L 51/5024; H01L 51/52; H01L 2251/5384; H01L 2251/53; H01L 27/3209; H01L 27/3225; H01L 27/3244; B60K 37/02; B60K 37/00;
(Continued)

(56) References Cited

U.S. PATENT DOCUMENTS 6,906,762 B1 * 6/2005 Witehira ............ G02B 27/2278
348/E13.014
2001/0002275 A1 * 5/2001 Oldenburg ......... A61K 41/0042
427/214
(Continued)

FOREIGN PATENT DOCUMENTS

WO 03-023491 A1 3/2003

*Primary Examiner* — Thoi Duong
(74) *Attorney, Agent, or Firm* — Craig A. Baldwin

(57) ABSTRACT

A visual display unit creating a three-dimensional volumetric space. The display includes a first screen in a first focal plane, wherein the first screen displays a first image. The display includes a second screen in a second focal plane distinct from the first focal plane, wherein the second screen displays a second image, and wherein the second screen at least partially overlaps the first screen. The display includes a physical object located between the first screen and said second screen, wherein at least one of the first and second images is displayed in response to a placement of the physical object.

23 Claims, 19 Drawing Sheets

Related U.S. Application Data continuation-in-part of application No. 13/438,833, filed on Apr. 3, 2012, now Pat. No. 8,687,149.

(51) Int. Cl.

| | | |
|---|---|---|
| *G06T 15/08* | (2011.01) | |
| *G06F 3/14* | (2006.01) | |
| *G06T 11/60* | (2006.01) | |
| *G02F 1/137* | (2006.01) | |

(52) U.S. Cl.
CPC ............ *G06F 3/1423* (2013.01); *G06T 11/60* (2013.01); *G02F 1/13718* (2013.01); *G02F 1/133555* (2013.01)

(58) Field of Classification Search
CPC .. B60K 37/06; B60K 35/00; B60K 2350/203; B60K 2350/2034; B60K 2350/1064; B60K 2350/903; B60K 2350/206; B60K 2350/2095; B60K 2350/106; B60K 2350/408; B60K 2350/1072; B60K 2350/403; B60K 2350/962; G01D 11/28; G01D 13/28; G01D 13/04; G01D 13/265; G01D 7/00; G01D 7/04; B60Q 3/044; B60Q 3/04; B60Q 3/0213; B60Q 3/004; B60Q 3/042; B60Q 3/046; B60R 1/04; B60R 1/12; B60R 1/00; B60R 2001/1215; B60R 21/01566; B60R 2011/0026; B60R 2300/20; B60R 2300/60; B60R 2300/8053; G02B 2027/0118; G02B 2027/0141; G02B 27/0101; G02B 6/0018; G02B 6/0081; G02B 6/0066; G09G 2360/141; G09G 2360/144; G09G 2380/10; G09G 2320/0646; G09G 2320/0653; G09G 3/325; G09G 3/3406; G02F 2001/133391; G02F 2001/133626; G02F 2001/13347; G02F 2001/133622; G02F 1/13; G02F 1/1313; G02F 1/1335; G02F 1/133555; G02F 1/133524; G02F 1/1336; G02F 1/133602; G02F 1/133603; G02F 1/133604; G02F 1/133615; G02F 1/1347; G02F 1/13471; G02F 1/13718; G02F 1/13476
USPC .......... 257/98, 89, 79; 340/438, 461, 815.4, 340/525, 425.5, 441, 459, 462, 691.1, 340/439, 691.6, 815.73, 815.78, 995.1; 359/630, 13, 717; 345/7, 633, 76, 35, 345/1.1, 1.3, 77, 87, 9; 349/15, 1, 112, 349/65, 74, 83, 61; 116/286, 250, 287, 116/288, 327, 329, 334, 62.2, 62.4; 362/23.2, 489, 23.16, 23.19, 23.01, 23.18, 362/503, 602, 23.1, 23.13, 23.15, 311.13, 362/317, 464, 543, 545, 610, 812, 97.2
See application file for complete search history.

(56) References Cited

U.S. PATENT DOCUMENTS

| | | | |
|---|---|---|---|
| 2010/0191419 A1* | 7/2010 | Habeney | B60K 35/00 701/36 |
| 2011/0154897 A1* | 6/2011 | Ishihara | B60K 37/02 73/431 |
| 2012/0139918 A1 | 6/2012 | Ashraf et al. | |
| 2013/0104061 A1 | 4/2013 | Gabriel et al. | |
| 2014/0362076 A1 | 12/2014 | Bell et al. | |

\* cited by examiner

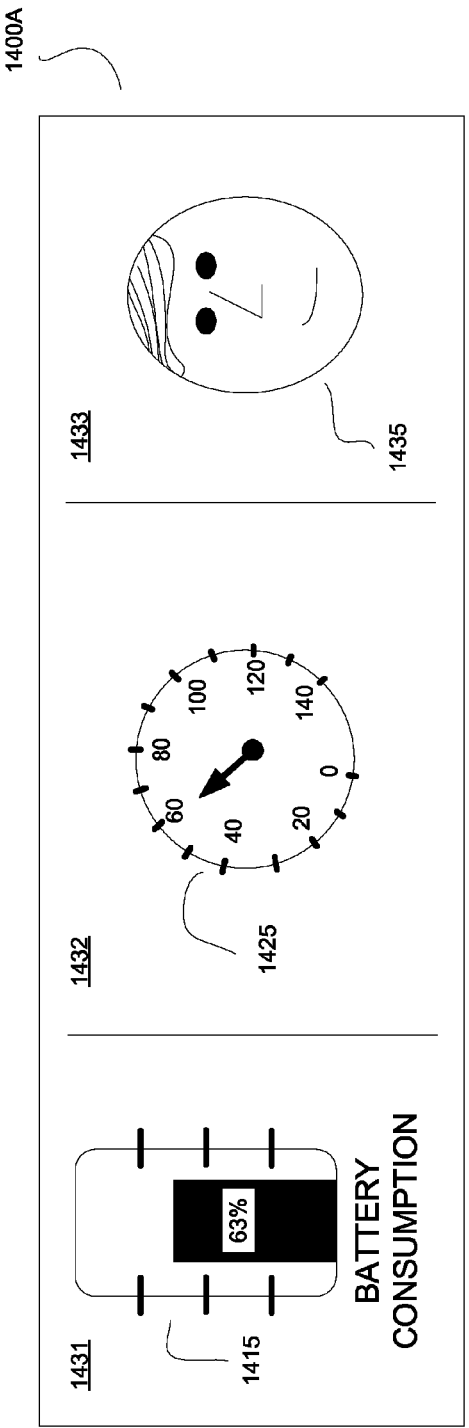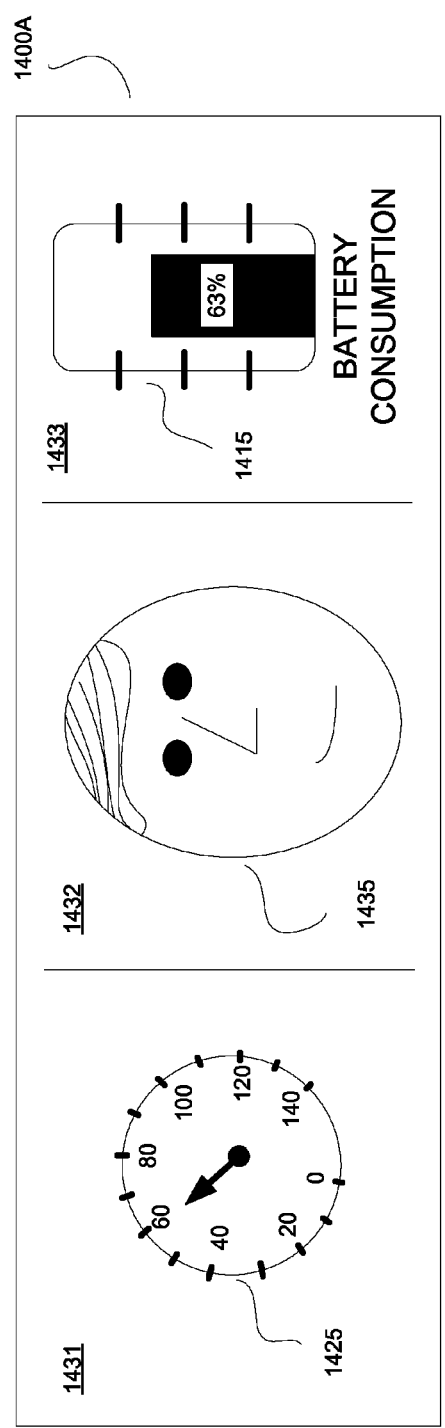

DISPLAY INTERPOSING A PHYSICAL OBJECT WITHIN A THREE-DIMENSIONAL VOLUMETRIC SPACE

CROSS REFERENCE TO RELATED APPLICATIONS

This patent application claims priority to and is a continuation of application Ser. No. 14/192,619 filed Feb. 27, 2014, which is a continuation-in-part of Ser. No. 13/438,833 (filed Apr. 3, 2012, now U.S. Pat. No. 8,687,149).

TECHNICAL FIELD

The present invention relates to a means for illuminating visual display units, particularly portable computing means including the genre known as Personal Digital Assistants (PDA).

BACKGROUND

The relentless tide of technological improvements in computing has inexorably led to ever more powerful computers, of ever-smaller volumes. This has given rise in recent times, to successively smaller incarnations of the Personnel Computer (PC), i.e., the desktop, laptop and notebook computer. Although of reduced physical dimensions in comparison to its predecessor, each has retained a conventional keyboard as its primary means of data input.

However, the advent of yet smaller personnel computing devices, i.e., the palmtop or Personal Digital Assistant (PDA) has precluded the use of a full-size keyboard. Furthermore, the display areas of such devices are equally restricted by their diminutive size. PDAs are typically the size of a user's hand, requiring the user interface to be designed so that input operations are not too intricate and sufficient space is available for data display. These factors are often applicable to a host of other mobile computing means such as mobile telephones, watches, calculators, data loggers, and so forth and as such these devices are included by reference herein.

These space constraints have lead to the incorporation of touchscreens as a means of combining the functions of both data entry and data display. A transflective liquid crystal display is overlaid with a transparent touch sensitive screen capable of detecting the position of a stylus point impressed upon it. The stylus may be used to select various icons and/or menus in order to issue instructions to the operating system and to input hand written data. Streamlined versions of popular spreadsheet, word processing and organisational programs are available for PDAs in addition to other specific applications designed for use within the constraints of the PDA hardware.

Most of the systems present in a conventional PC are present in a PDA. These include volatile/dynamic and permanent information storage devices or memory and a logic processor. In contrast to PCs, the operating system of a PDA is usually proprietary and stored on an on-board ROM. Subsequent user-loaded applications are stored in solid state "flash memory" rather than the rotating storage media (magnetic or optical) typically employed in PCs.

Typical PDA transflective displays consist of a birefringent liquid with a chiral additive trapped between conductive layers rubbed with a cloth or similar to align the liquid crystal molecules in a suitable manner. The birefringence of the liquid crystal may be switched to zero by applying an electric field perpendicular to the alignment layers. To achieve this one of the conductive layers is broken up into small, square or rectangular, addressable, electrodes tessellated to form a matrix while the other forms a voltage reference plane. Colour filters can be added over the electrodes to improve the effect.

This arrangement is then placed between sheets of polarising film with either aligned or perpendicular polarisation axes, located in front of a half-silvered mirror and provided with illumination. As the half-silvered mirror transmits 50% and reflects 50% of the incident light, the display can be illuminated from either side, i.e., front or back lit.

Larger, transparent liquid crystal displays (LCD) are fabricated in a similar fashion as the transflective displays with the omission of the half-silvered mirror. Backlighting is provided by cold cathode fluorescent tubes in combination with a light-guide, also known as a light pipe, and diffuser.

Prior art light pipe backlight assemblies are constructed from a light guiding panel with boundaries substantially coterminous with the LCD panel edges (normally rectangular), typically fabricated from an acrylic plastic with similar optical properties to those of borosilicate. A pair of miniature fluorescent light tubes are mounted within suitably designed light reflective mounts (i.e., located at the foci of parabolic reflectors) along the opposite side edges of the acrylic sheet.

The function of the fluorescent light tubes is to produce and direct incoherent light into the interior of the light guiding panel within which the light is typically bounded by the well known principle of "total internal reflection". Under ideal conditions, light will not leak out of the surfaces of the acrylic plastic sheet. However, light can be extracted or caused to 'leak' out from the light guide surface by forming therein scratches, undulations, or any other means of locally altering the critical angle for total internal reflection. The extracted light can be used for illumination purposes such as the above described LCD panel backlighting. A reflector is placed behind the rear surface of the light pipe to reflect rearward emitted light through the LCD, adding to the display illumination.

In order to compensate for the decrease in light guide light intensity as a function of distance from the fluorescent tubes, a light extracting pattern is permanently formed on one or both surfaces of the light guiding panel. Typically, the light extracting pattern is realized as a dot pattern permanently embossed or sandblasted upon the front surface of the acrylic light guiding panel.

In order to achieve light intensity compensation along the light guiding panel, the density of the dot pattern may be configured to increase quadratically with distance from the fluorescent light tubes. This construction provides a constant backlighting luminance across the light guiding panel. Alternative means of maintaining a uniform light emission intensity across the light guide surface is to form the panel with a tapering cross-sectional profile.

In order to integrate (i.e., diffuse) the spotted distribution of light emanating from the light extracting pattern towards the LCD panel, a light diffusing sheet is placed on top of the light guiding panel. The diffuser is generally a thin sheet of transparent plastic or glass material which has one surface imprinted with small ($\approx 10^{-6}$ m) humps and hollows, is placed over the face of the guide resulting in a thin, bright, uniformly lit lambertian surface. Prismatic films may be also placed between the display and the backlight to increase its efficiency.

A second light diffusing sheet is placed over the rear surface of the light guiding panel in most commercial "light pipe" backlight designs, to diffuse the spotted distribution of light emanating from the permanently formed diffusion dot pattern on the rearward surface facing towards the reflective surface disposed behind the light guiding panel.

The combination of the light guiding panel, fluorescent light tubes, diffusing sheets and the reflective layer together produce a plane of backlight having a uniform spatial intensity for illumination of the LCD panel affixed to the backlighting panel.

Transflective display constructions are employed in most PDA devices due to their reduced power storage capabilities and their need to function in outdoor and/or bright ambient light conditions.

PDA devices may be generally characterized therefore as having a shortage of display/input interface area and a limited ability to operate power intensive devices such as high luminance emissive displays.

One means of addressing the shortage of display/input interface area is by overlaying a further transparent display pane over the existing PDA display. This type of technology (as described in the applicants co-pending applications PCT/NZ98/00098 and PCT/NZ99/00021, incorporated herein by reference) enables, by various means, the stacking of image planes at set distances. These configurations provide intrinsic motion parallax, where the x and y distance changes between objects displayed on different planes depending on viewing angle, binocular depth cues and separate focal planes that may be brought in and out of focus depending on where the viewer fixes his or her attention.

However, the addition of a further display screen overlaying the existing screen of a PDA type device results in a significantly darkened combined display. This is due in part to the intrinsic attenuation of light passing through the additional layers of the additional display and to the unpracticality of increasing the backlighting luminance due to the power constraints discussed above.

There is therefore a need to provide an enlarged display area of PDA type devices (as hereinbefore defined) without incurring a detrimental loss in display brightness.

All references, including any patents or patent applications, cited in this specification are hereby incorporated by reference. No admission is made that any reference constitutes prior art. The discussion of the reference states what their authors assert, and the applicants reserve the right to challenge the accuracy and pertinency of the cited documents. It will be clearly understood that, although a number of prior art publications may be referred to herein, this reference does not constitute an admission that any of these documents forms parts of the common general knowledge in the art in any country.

It is an object of the present invention to address the foregoing problems or at least to provide the public with a useful choice.

SUMMARY

According to one aspect of the present invention there is provided a method of adapting a visual display unit having a first screen in a first focal plane by the addition of one or more at least partially transparent display screens at least partially overlapping said first screen and located in focal planes distinct from said first focal plane, characterized in that
   an at least partially transparent emissive layer is provided between said first screen and at least one said additional display screen.

As used herein, the term 'emissive layer' includes any optical component capable of emitting light when stimulated by an external input, whether electrical, optical, mechanical, magnetic or other.

As used herein, the term 'visual display unit' includes, but is not limited to personnel digital assistants (PDA), computing means—including portable and/or hand held, devices, mobile phones, watches, calculators, data loggers, cameras, instrument displays, televisions, and any other electronic display means.

According to a further embodiment, there is provided visual display unit produced by the above-described method.

According to a still further aspect of the present invention there is visual display unit having two or more at least partially overlapping display screen located in distinct focal planes, at least one said screen being at least partially transparent; characterized in that an at least partially transparent emissive layer is provided between said screens.

It may be seen therefore, that a visual display unit such as a PDA may be adapted to incorporate multi focal plane displays and an emissive layer either at the initial manufacturing stage, or retro-fitted as a separate accessory.

According to one aspect of the present invention, said emissive layer is a sheet with substantially planar opposed upper and a lower surfaces and a peripheral boundary of a prescribed thickness, said sheet formed from a material such that light rays incident from said peripheral boundary are retained between the said planar surface through total internal refraction at angles less than a critical angle.

Preferably, at least one said sheet planar surface has a plurality of defined features located thereupon capable of refracting a said retained light ray incident on a said feature through an angle greater than the said critical angle of total internal reflection sufficient to exit said sheet via one of said planar surfaces.

Preferably, said features include diffusion dots, predetermined scratches, indentations grooves, protrusions, regular or irregular undulations and the like.

Preferably, at least one light source such as cold cathode fluorescent tube is located along said peripheral edge.

In an alternative embodiment, said light source is an array of light emitting diodes.

Preferably, said emissive layer is configured to refract the ray axis of light at the said peripheral border such that the peripheral border between adjacent screens is not visible along said viewer's sightline.

According to one aspect of the present invention, the said features are distributed with an increasing density as a function of distance (e.g., a quadratic function) from said light source.

According to an alternative embodiment of the present invention, the said prescribed thickness of the emissive sheet is reduced as a function of distance from a said light source.

The above configurations of the said feature distribution and emissive sheet thickness both provide a means of outputting a uniform light intensity, avoiding decreasing intensity with distance from the light source.

According to one embodiment of the present invention, said emissive layer is formed from a light guide.

According to an alternative embodiment of the present invention, said emissive layer is formed from a transparent organic light emitting diode (TOLED) assembly.

A TOLED emits light uniformly from both sides and does not necessarily require the above-described means of controlling the light intensity distribution via said defined features and the like.

However, the fact that light emits from both sides of a TOLED can in-itself cause degradation of the image seen by the viewer. This is due to the fact that light emitted upwards through transparent portions of the front LCD panel towards the viewer will be transmitted with equal intensity, irrespective of whether the rear LCD panel is displaying a clear or black region at any given point on the rear screen.

Whilst this causes no drawback for the transparent portions of the rear screen, black regions (e.g., text) appear grey, with reduced contrast to an adjacent transparent region. The light emitted from the TOLED has no means of being directly varied according to whether it is aligned or overlays a portion of black text on the rear screen.

This drawback is addressed by the use of a wire grid polariser and a polarised TOLED, i.e., a TOLED emitting polarised light. Optionally, an optical retarder may also be incorporated. This combination (described below) effectively re-cycles the light radiating directly upwards from the TOLED and re-orientates the polarisation of the light to maximise the illumination of the displays without degrading the display contrast.

Thus in a preferred embodiment of the present invention, said emissive layer is a polarised TOLED emissive layer located between a front screen and a rear screen, wherein a wire grid polariser and is interposed between the TOLED and the front screen.

As used herein, the front and rear screens are defined with respect to the physical proximity of a user viewing the displays in a conventional mariner, i.e., the front screen is nearer to the user than the rear screen. One or more additional screens may be located between the said front and rear screens.

Polarised light is emitted from both surfaces of the TOLED, with the upward/outward emissions potentially degrading the clarity, contrast and/or effectiveness or the composite image formed by all the overlapping display screens.

Wire grid polarisers are defined herein to include any polariser capable of transmitting P polarised light whilst reflecting S polarised light or vice versa.

Polarization is defined relative to the plane of incidence, i.e., the plane that contains the incoming and reflected rays as well as the normal to the sample surface.

S polarization is where the electric field is perpendicular to the plane of incidence, while for P polarization, the electric field is parallel to the plane of incidence.

Wire grid polarisers may be formed from a variety of materials and manufacturing techniques, though they generally include a regular formation of spaced lines formed on a transparent substrate or film.

The strips may be an array of extremely fine metal wires deposited on a face of an optically transparent window such as KRS-5 or ZnSe. Since the electric field of the light oriented along the direction of wires can induce electrical currents along the wires, the wire grid acts as a metal surface reflecting virtually all the radiation polarized along the direction of the wires. The electric field perpendicular to the direction of wires is unable to induce electrical current in the wire grid. Thus, the light transmits through the polariser with only the reflectance losses from the substrate window.

In alternative constructions, precisely spaced groves are ruled directly into a highly polished $CaF_2$ or ZnSe substrate which is then aluminised. Holographic methods may also be employed to produce grooves for holographic wire grids.

Thus, wire grids have the property that incident light of a given polarisation may pass through the polariser, whilst light of orthogonal polarisation to said given polarisation is reflected reciprocally. It follows therefore, that if a wire grid polariser is illuminated by light polarised in the same direction as the polarisation axis of the grid, all the light will be reflected. Conversely, polarised light orientated orthogonally to the polarisation axis of the wire grid will be transmitted through the grid. However, polarised light incident on the wire grid polariser.

In one embodiment therefore, the polarisation axis of the wire grid is arranged to reflect polarised light emitted from the TOLED back through the TOLED towards the rear screen.

Preferably, said rear screen is a cholesteric LCD display.

In one embodiment, the reflected light passes through a quarter wave retarder before being reflected by said rear screen. This produces a quarter wavelength shift in the light, which is then reflected and circularly polarised by the rear display. However, it will be appreciated that retarders producing other degrees of retardation may be utilised, depending on the characteristics of the incident light and the display screens.

The light reflected by the rear display passes through the quarter wave retarder a second time before passing through the TOLED a second time to the wire grid polariser. The retarder applies a further quarter wave shift resulting in linearly polarise light. Regions denoting text or graphics on the rear display, i.e., those regions preventing the transmission of light, remain un-illuminated regions in the light reflected from the rear screen to the viewer.

The linearly polarised light then passes through the wire grid polariser and front screen polariser.

The above configuration thus effectively re-cycles the light emitted from the upper surface of the TOLED which would otherwise degrade the contrast and luminance of the image seen by viewer.

In an alternative embodiment, the retarder may be omitted altogether. In such embodiments, the light emitted from TOLED directly towards the rear screen (10) plus the light reflected from the wire grid polariser is directly reflected by the rear screen (10) before being transmitted through the wire grid polariser and front screen.

The degree to which the reflected light from the rear display is transmitted through the wire grid polariser depends on its polarisation, which in turn depends on the polarisation of the light incident on the rear screen. A cholesteric rear LCD rear screen behaves essentially as a circular polariser. Consequently, for the three possible polarisations of light incident on the rear screen, the reflected light polarisation is as follows:

i. the incident light is randomly polarized in which case that which is reflected Will be circularly polarized;
ii. the incident light is linearly polarized in which case it will emerge circularly polarized;
iii. the incident light is elliptically polarized in which case it will emerge as elliptically polarized.

The reflected light is able to pass through the wire grid unaffected if its polarisation orientation corresponds with the transmission axis of the wire grid, i.e., linearly polarised.

If the reflected light is circularly polarised, it is advantageous to use an appropriate retarder to correct the polarisation alignment to match that of the wire grid polariser.

Preferably, said screens are liquid crystal displays. However, it will be understood alternative constructions are possible and the invention is not necessarily limited to the use of LCDs.

The main criteria for the rear display is that it reflect the incident light to at least some degree. Alternatives to LCD displays suitable for this purpose include the recently developed 'electronic paper'. This is an area of considerable interest in display research circles, with the aim of producing a product forming an electronic alternative to conventional paper with a very thin, inexpensive, low power consumption display for text and static images. This electronic paper is intended to provide a product that is addressable in the manner of a desktop display but without the same bulk.

Technologies involved include interferometric modulators which are formed by a switchable array of optically resonant cavities, micro-encapsulated electrophoretic displays which use electrically controllable pigments as well as well established reflective and transflective liquid crystal technologies.

These and any other type of display that reflects between 10% and 100% of the incident light would be suitable for use as the rear display in the present invention.

Consequently, by virtue of incorporating an at least partially transparent emissive layer, a practical multi-focal plane visual display unit such as a PDA may be realized. The transparent properties of the emissive layer permit transflective display constructions to be retained and thus dispensing with the need for additional powered display illumination in conditions of high ambient light. When additional illumination is required indoors, or in low-light environments, the emissive layer provides a low-power means of providing the necessary illumination.

It will furthermore be appreciated that the above-described configuration using a TOLED as the emissive layer need not necessarily be applied between two display screens.

Instead, the configuration may be used as a front illumination means in other single or multi layer displays, either individually, or in combination with other backlight and/or emissive layers located between the displays.

Thus, according to a further aspect of the present invention there is provided a visual display unit illumination assembly including;
 a polarised transparent organic light emitting diode (TOLED) and a wire grid polariser located between the TOLED and an observer viewing the visual display unit.

Optionally, said illumination assembly incorporates an optical retarder located between the TOLED and a rear of the display. The degree of retardation (e.g., a quarter wave retarder) may be defined according to variation between the polarisation of the light emitted from the TOLED and reflected from the rear display screen(s) and polarisation transmission axis of the wire grid polariser. It will be appreciated that the degree of retardation provided by optical retarder need be half the total phase shift required, as the light passes through the retarder twice.

Said illumination assembly may be used in front of a visual display unit comprised of one or more screens, though attenuation of light by successive screens places a limit on the number of screen layers. The illumination assembly may also be located between two screens in a multi-layered display, as described in the above embodiments.

The visual display unit illumination assembly may thus be fitted to the front of a multi-layered display, such as a two screen LCD display unit as a replacement for a conventional backlight. The illumination assembly may also be used in applications where a user needs to view an object/scene from substantially the same direction as an illumination source directed at the scene/object, e.g., a dentist's or jeweller's light with a central transparent magnifying section.

Accordingly, embodiments of the present invention disclose a visual display unit creating a three-dimensional volumetric space. The display includes a first screen in a first focal plane, wherein the first screen displays a first image. The display includes a second screen in a second focal plane distinct from the first focal plane, wherein the second screen displays a second image, and wherein the second screen at least partially overlaps the first screen. The display includes a physical object located between the first screen and the second screen, wherein at least one of the first and second images is displayed in response to a placement of the physical object.

In accordance with another embodiment of the present invention, a method for adapting a visual display unit is disclosed, wherein the method includes creating a three-dimensional (3D) volumetric space with images. The method includes providing a first screen in a first focal plane, wherein the first screen displays a first image. The method includes providing a second screen in a second focal plane distinct from the first focal plane, wherein the second screen displays a second image, and wherein the second screen at least partially overlaps the first screen. The method includes providing a physical object located between the first screen and the second screen, wherein at least one of the first and second images is displayed in relation to the physical object.

In an alternative embodiment of the present invention, a method for adapting a visual display unit is disclosed, wherein the method includes creating a three-dimensional volumetric space with images. The method includes providing a first screen in a first focal plane, wherein the first screen displays a first image. The method includes providing a second screen in a second focal plane distinct from the first focal plane, wherein the second screen displays a second image, and wherein the second screen at least partially overlaps the first screen. The method includes creating a 3D volumetric space by relating the first image and the second image. The method includes interposing a physical object about the 3D volumetric space, wherein at least one of the first and second images is displayed in relation to the physical object.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

Further aspects of the present invention will become apparent from the following description which is given by way of example only and with reference to the accompanying drawings in which:

FIG. 14B is an illustration of a physical object placed between two or more displays as shown in FIG. 14A, along a line-of-sight of a viewer, such that each item of information is separated from other items of information, in accordance with one embodiment of the present disclosure;

FIG. 14C is an illustration of a physical object placed between two or more displays as shown in FIG. 14A, along a line-of-sight of a viewer, such that each item of information is separated from other items of information, but with a different arrangement than that shown in FIG. 14B, in accordance with one embodiment of the present disclosure;

DETAILED DESCRIPTION

FIGS. 1-7 illustrate preferred embodiments of the present invention in the form of a personal digital assistant (PDA), or parts thereof. However, it should be appreciated that the present invention is equally applicable to a variety of visual display units including portable and/or hand held computing means such as mobile phones, watches, calculators, data loggers, and such like and these are defined for the purposes of the specification as being encompassed by the invention.

Figure 1:
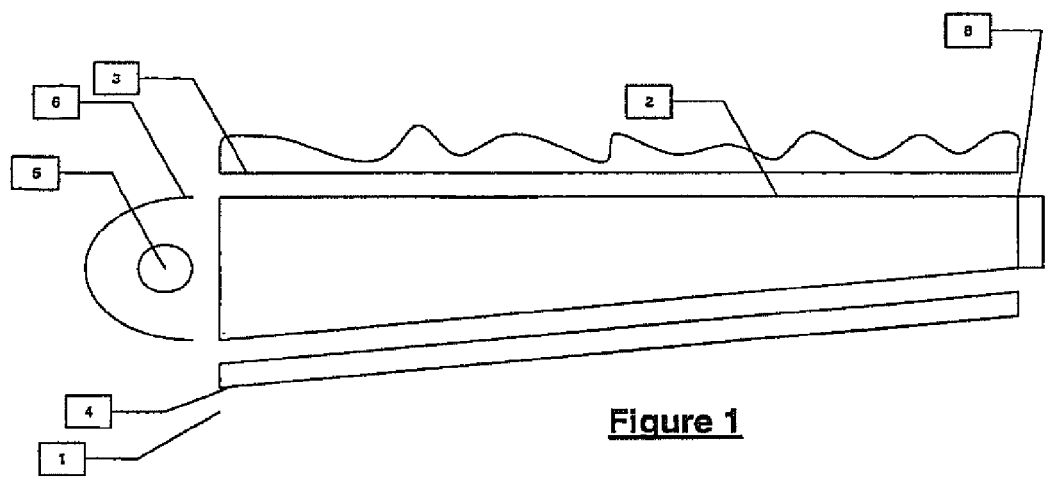
FIG. 1 shows a schematic cross sectional side elevation through a light pipe backlighting assembly of prior art displays.

Existing devices incorporating portable visual display units such as PDAs are severely restricted in their power consumption requirements of their components due to the limited battery storage capacities. Consequently, there is widespread adoption of transflective displays and the use of light pipes or light guides as part of the back lighting assembly. FIG. 1 shows a typical back light assembly (1) used in notebook type computers incorporating a light guide (2) in the form of a rectangular clear acrylic sheet with a substantially planar upper and lower surface with a diffuser (3) and a reflector (4) affixed thereto or located adjacent to respectively.

The light guide has along one peripheral edge, a cold cathode florescent tube (5) housed within a parabolic reflector (6) which reflects the illumination through the peripheral boundary wall of the light pipe (2), it there being retained by virtue of total internal reflection. Either or both of the planar surfaces of the light guide (2) may be provided with a plurality of diffusion dots (7). Essentially, the light guide (2) provides an illumination source and is not part of the optical portion of the display.

Figure 2:
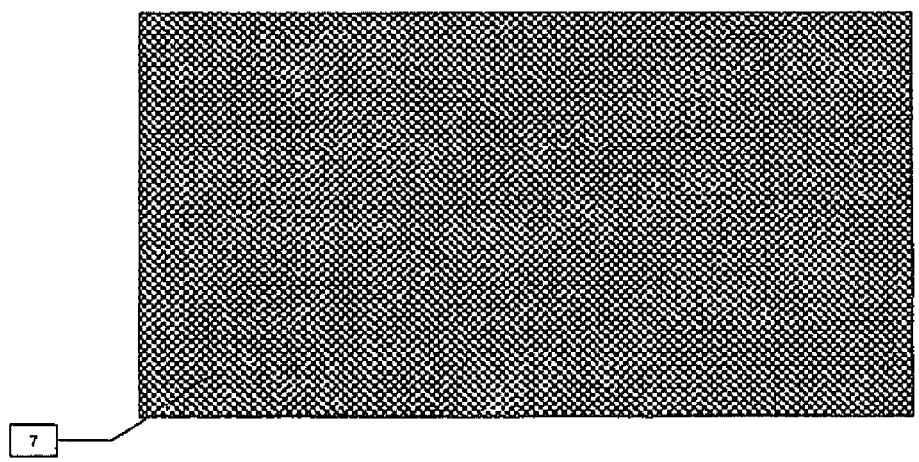
FIG. 2 shows a plan view of the diffusion dot dispersion pattern distributed on the surface of a light pipe.

As shown in plan view in FIG. 2 the diffusion dots (7) are localised regions whereby the light constrained within the light guide striking the diffusion dots (7) exceed the critical angle for total internal refraction and are emitted from the planar surface. To maintain an even distribution of luminosity, the cross sectional profile of the light guide (2) tapers with respect to distance from the florescent tube (5). The opposing peripheral edge to the florescent tube (5) is provided with an end reflector (8).

The back lighting assembly shown in FIG. 1 is located at the rear most portion of typical notebook-type computer display screens.

Figure 3:
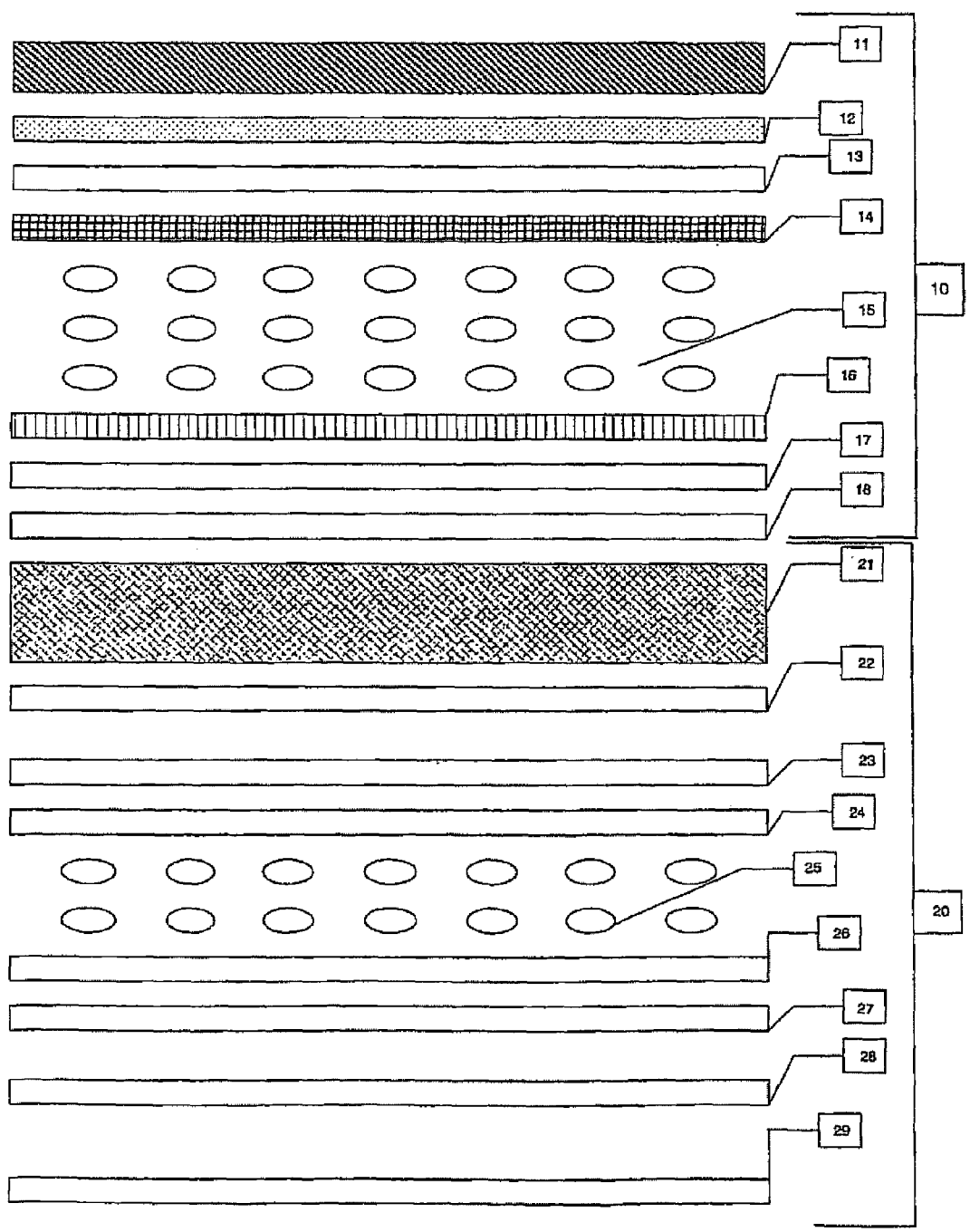
FIG. 3 shows a schematic composite view of a first preferred embodiment of the present invention.

Display area and/or user input interface area is at a premium in PDAs due to their size. FIG. 3 shows a cross sectional diagram through an existing PDA (1) configuration fitted with a supplementary display (20), which is parallel to and spaced apart from the original display (10).

Referring specifically to FIG. 3, a polarised back light source (11) (of known type) located at the rear of the display (10) is placed behind a composite series of layers comprised, in sequence, of a half silvered mirror (12), a glass substrate (13), a rubbed conductive ITO ground layer (14), a liquid crystal (15), an ITO layer with an electrode pattern and subsequent rubbed polyimide layer (16), glass substrate (17) and an analyser (18). This construction is typical of transflective LCDs as is well known to those in the art and is not discussed in further detail.

The original display (10) may be augmented by attaching a second display (20) which is attached over the planar face of the original display (10) and is substantially co-terminus with same.

The second display (20) is also comprised of a plurality of layers which in sequence from the front of the original display (10) consists of, an emissive transparent refractor (21), a rear analyser/polariser (22), a glass substrate (23), a rubbed ITO conductive ground layer and subsequent polyimide alignment layer (24), a second liquid crystal (25), a rubbed polyimide alignment layer and subsequent ITO electrode pattern (26), a front glass substrate (27), front analyser (28), and a diffuser (29). The diffuser (17) may be applied to the surface of a touch screen layer (30). FIG. 3 shows an embodiment whereby the two display assemblies (10, 20) are combined at the manufacturing stage as a homogenous unit.

Figure 4:
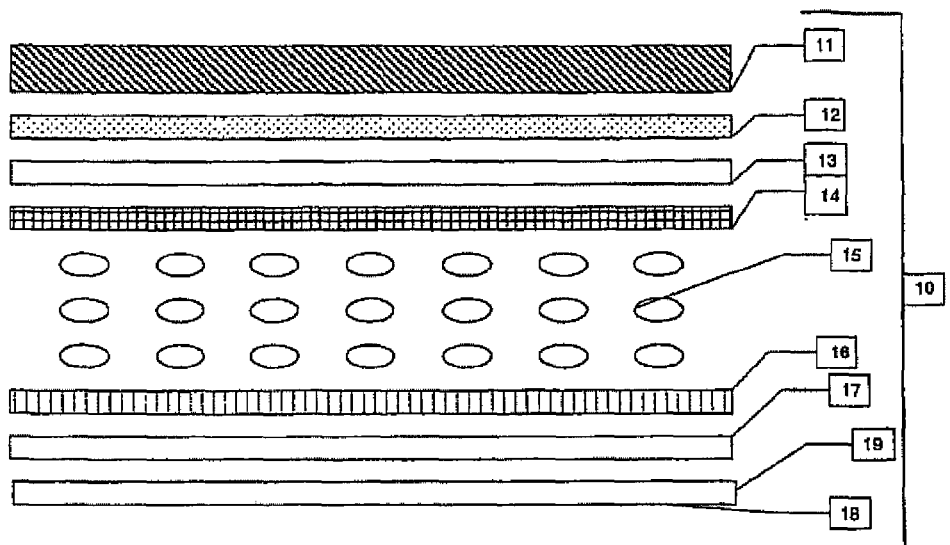
FIG. 4 shows a schematic cross section through a known PDA display.
Figure 5:
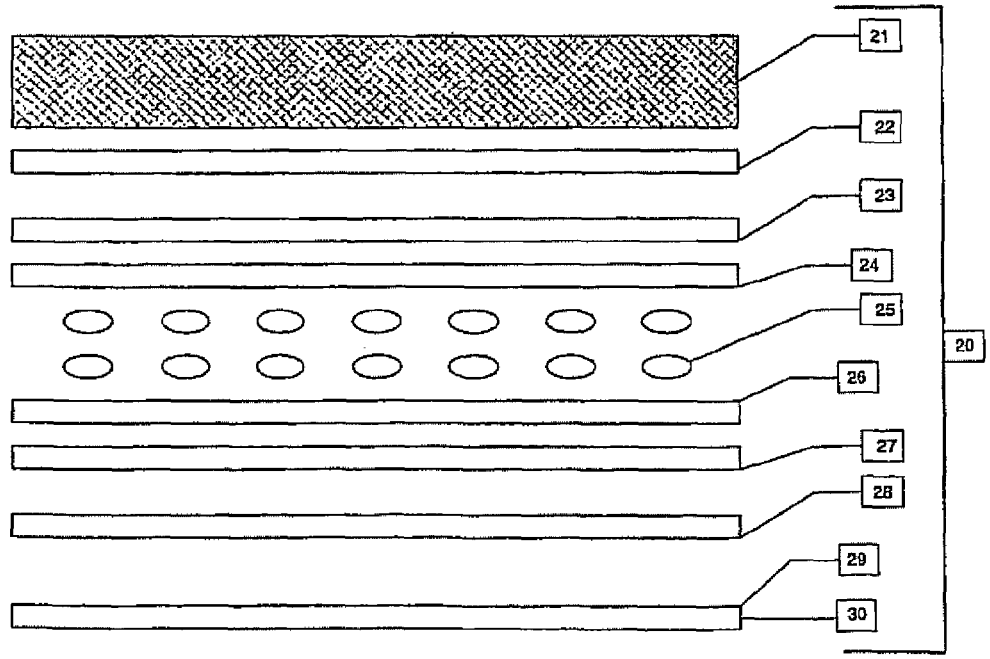
FIG. 5 shows a schematic cross sectional view through a further preferred embodiment of the present invention.

Alternatively, the second display (20) may be retro-fitted as a distinct unit to the front of a PDA display (10) as, illustrated in FIGS. 4 and 5 where identical elements to that shown in FIG. 3 are like numbered.

FIG. 4 shows an existing PDA display (10) with the additional layer (to that illustrated in FIG. 3) of a touch screen layer (19) to which the diffuser (18) layer may be affixed. FIG. 5 shows the secondary display screen (20) which is connected to the original screen (10) via appropriate mounting clips (not shown) and coupled to the PDA processor via appropriate drive electronics and power supply interfaced via an expansion slot as commonly found in known PDAs. Such interconnections are well known to those in the art and are consequently not discussed further herein.

The emissive layer, or emissive transparent refractor (21) is formed in one embodiment from a sheet of acrylic plastic known as a light guide (2) or light pipe as described with reference to FIG. 1. A light guide generally consists of a sheet with two substantially planar opposing surfaces on which a number of defined features such as diffusion dots (7) are located. The light guide is illuminated by one or more light sources, e.g., cold cathode florescent tubes (5) located about the peripheral edge of the light guide (21) in a corresponding manner to that shown in FIG. 1.

The configuration of the emissive layer (21) corresponds almost directly to the light guide (2) shown in FIG. 1 with exception that a lower reflector (4) is omitted. Light may be emitted from both planar surfaces from the emissive transparent light guide (21) to directly illuminate both LCD displays, (10, 20). However, preferably, only the lower planar surface of the light guide (2) is provided with a plurality of diffusion dots (7) to restrict the emitted illumination to the rearward display (10) only. The light is then reflected from the cholesteric liquid crystal in the rearward display (10) and is transmitted through the emissive layer (21) and front display screen (20).

Restricting the light emission in this manner ensures regions of text or graphics on the rearward screen (10) do not align directly with light emitted directly from the emissive display (21) through the front display (20) to a viewer with a corresponding reduction in contrast and greying/fading of tones.

Figure 6:
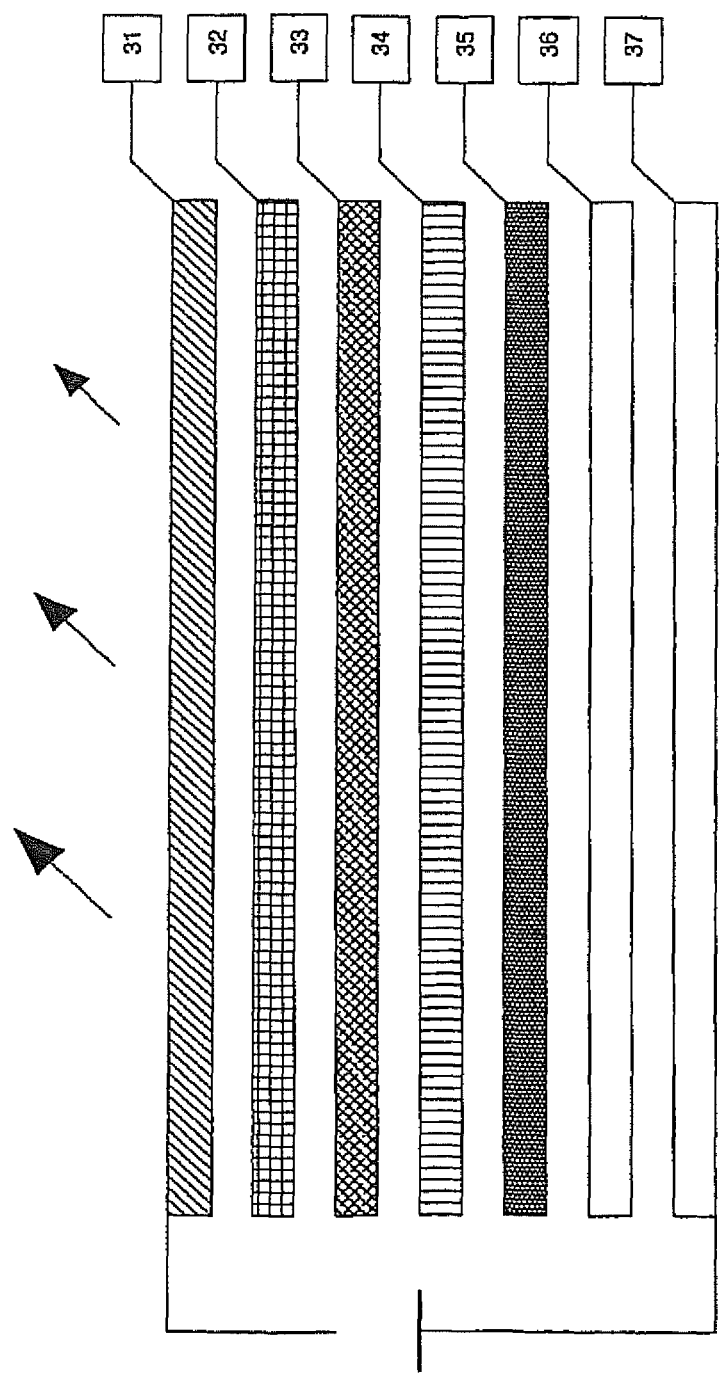
FIG. 6 shows a schematic cross sectional view through an TOLED in accordance with a further preferred embodiment of the present invention.
Figure 7:
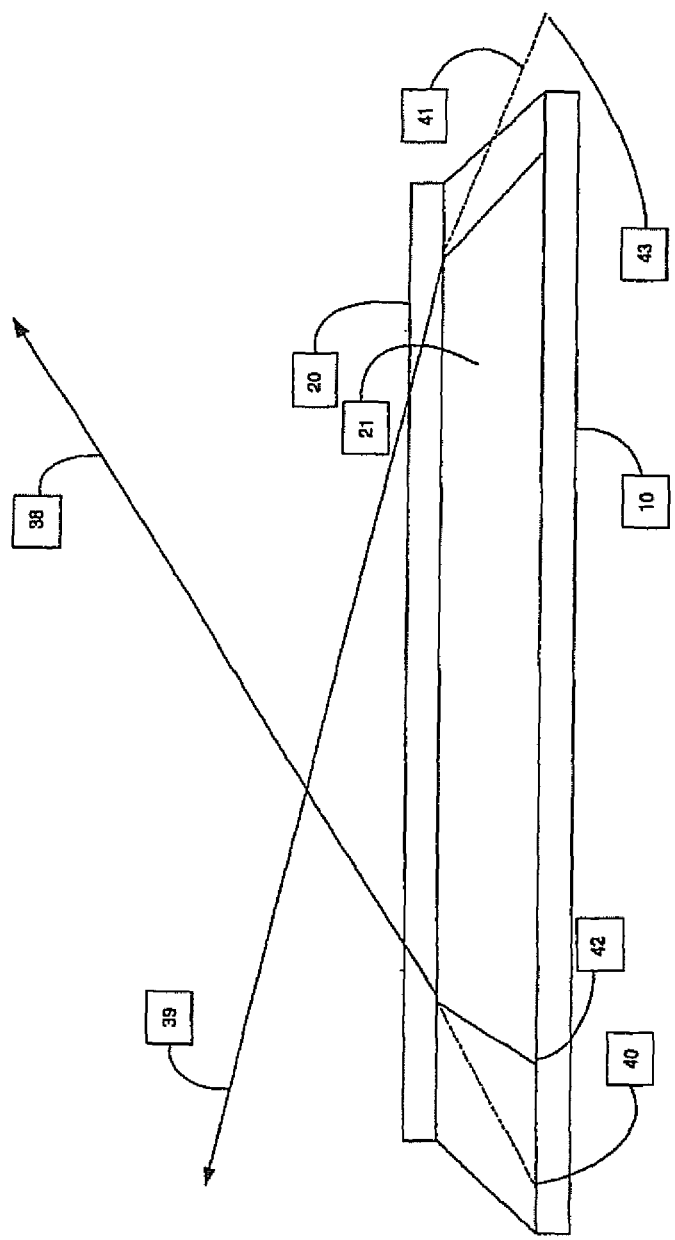
FIG. 7 shows a schematic cross sectional view through the embodiment of the present invention shown in FIGS. 3, 5 and 6.

In an alternative embodiment, the light guide (21) may be replaced by a transparent organic light emitting diode (TOLED) light source (30). FIG. 6 shows an existing TOLED backlight (30) composed of a further plurality of layers in the form of a transparent anode (31), a glass plate (32), a hole injection layer (33), a hole transport layer (34), an electron transport layer (35), a light generating layer (36) and a cathode (37).

Organic light omitting diodes are a recent entry in the field of display technology and provide numerous beneficial characteristics for use in lighting applications. However, large area TOLEDs are not currently available, thus lending TOLEDs backlights to small area LCD displays and the like. The operating principle of a TOLED (30), as illustrated in FIG. 6 is based on electron-whole recombination. A glass plate (32) containing transparent anode (31) (usually an ITO) is employed as a substrate for depositing small molecules in a series of organic layers (33-36). Electrons are injected in the organic layers (33-36) by the cathode upon application of a DC voltage beyond a critical threshold voltage. Holes are correspondingly injected into the organic layers (33-36) by the anode (31). Electrons travelling through the electron transport layer (35) meet the holes from the anode (31) through the hole injection layer (33) and hole transport layer (34). The recombination of the electrons with the holes at the light-generating layer (36) creates "excitons" (excited neutral molecule) which subsequently fall back to ground state thereby releasing the recombination energy in the form of visible radiation.

The light-generating layer (36) may be doped with traces of specific organic molecules (dopants) in order to improve the efficiency of the generated light. The light generating layer (36) utilising dopants is generally called the "host" layer. Appropriate choice of dopants and hosts can lead to the generation of different colour light; white light may be created by two layers of hosts and dopants.

In order to utilise the TOLED (30) illustrated in FIG. 6 as an emissive transparent refractor (21), (as opposed to its role as a back light), it is necessary to specify that the cathode (37) is transparent in order that the emitted light may illuminate both the LCD screens (10, 20). Possible configurations of embodiments using TOLED (30) in place of a light guide (2) as the emissive layer (21) correspond to that shown in FIGS. 3-5, with the substitution of the TOLED (30) for the emissive transparent refractor (21).

By farming the rearward screen (10) to be enlarged with respect to the front screen (20), the refractive properties of the emissive transparent reflector (21) prevent the sightline access of the viewer from detecting the actual edge boundaries of the rearward display (10) at shallow angles of incidence. This may be seen in FIG. 7 whereby emitted light rays (38 and 39) originating from object points (42, 43) respectively appear to originate from image points (40, 41) respectively. This prevents the peripheral edge of the portion of the combined display located between the separate LCD units (10, 20) being visible to the viewer. This also enhances the three-dimensional quality of the whole display (10, 20).

It will be appreciated that various alterations and permutations may be made to the display assemblies shown without departing from the scope of the invention. For example, two or more further displays (20) may be added to an existing display (10) to provide yet further available display area, each display with or without an associated emissive transparent refractor (21).

Although the above embodiments refer to the use of a liquid crystal displays, it will be understood that these are not essential and that any alternative displays technologies may be employed, whether non-emissive or self-emissive, provided the or each front display is at least partially transparent.

Figure 8:
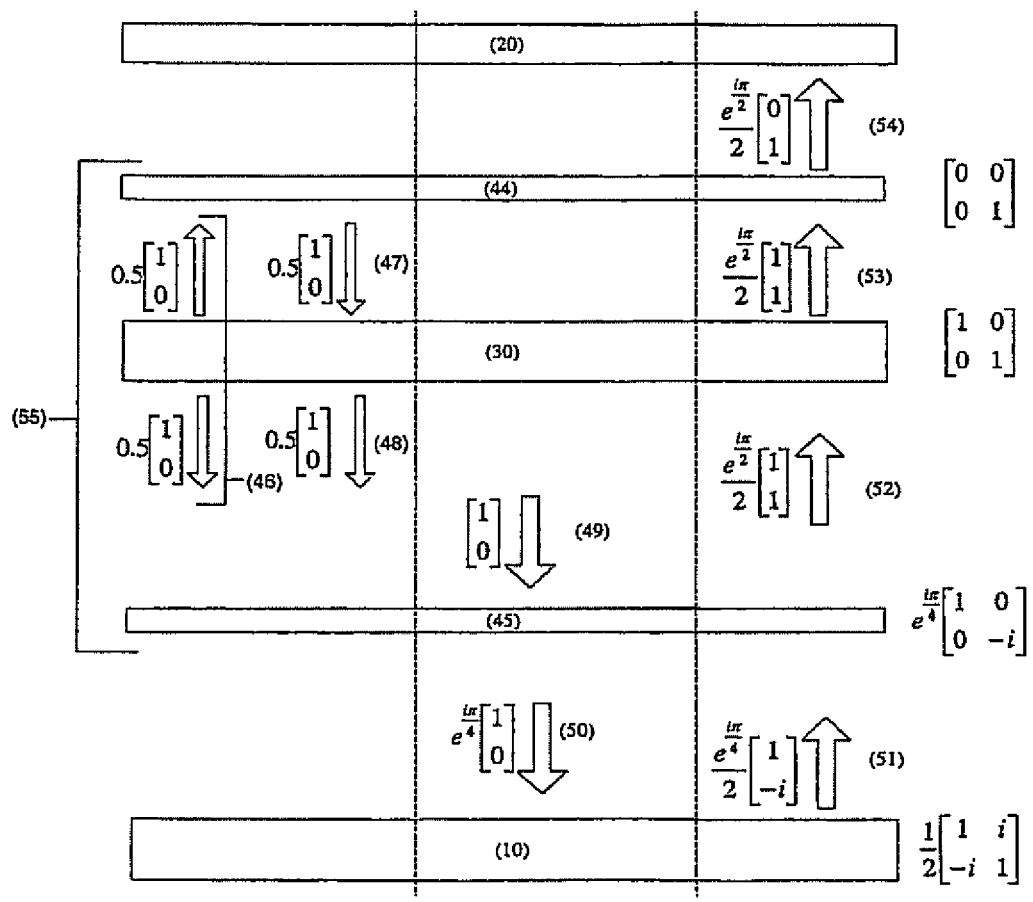
FIG. 8 shows a schematic cross sectional view through a TOLED in accordance with a further preferred embodiment of the present invention.

FIG. 8 shows a yet further embodiment of the present invention, addressing a shortcoming of the above-described TOLED-based embodiment. As light is emitted equally from both surfaces of the TOLED, areas of the TOLED overlapping regions of text or graphics on the rearward screen (10) will appear grey (in the case of a display using monochrome LCD screens) instead of black, due to the extra luminance emitted towards the viewer by TOLED As the light transmitted from the TOLED through front screen (20) has no interaction with the rearward display (20), it is impossible to overcome this drawback without intervening in the optical path of the light. Unlike a light guide (2), it is difficult to restrict the emission of light to only one surface without affecting the transparency of the TOLED (30).

This difficulty is overcome in the embodiment shown in FIG. 8 by incorporation of a wire grid polariser (44) between the TOLED (30) and the front (20) screen and an optical retarder (45) located between the TOLED (30) and rearward screen (10).

The passage of light emitted from the TOLED (30) layer is described with reference to stages 46-53 with reference to the associated Jones vectors and matrices.

In this embodiment, the TOLED (30) is configured to emit polarised light. Initially, light is emitted (stage 46) from both sides of the TOLED (30) towards the front (20) and rearward (10) displays, each represented by the Jones Vector (46) of $$0.5\begin{bmatrix}1\\0\end{bmatrix}.$$

The light (47) emitted towards the front display (20) is reflected from the wire grid polariser (44) and passes back through the TOLED (30), summing with the light (48) originally emitted towards the rear screen (10) (of the same polarisation) with the resultant light (49) having a Jones Vector of $$\begin{bmatrix}1\\0\end{bmatrix}.$$

The resultant linearly polarised illumination (49) passes through the optical retarder (45) which applies a corresponding phase shift. In the embodiment shown the retarder (45) produces a quarter wavelength phase shift, as denoted by its corresponding Jones matrix $$e^{\frac{i\pi}{4}}\begin{bmatrix}1 & 0\\0 & -i\end{bmatrix}.$$

The resultant transmission is given by the equation;

$$e^{\frac{i\pi}{4}}\begin{bmatrix}1 & 0\\0 & -i\end{bmatrix}\begin{bmatrix}1\\0\end{bmatrix}=e^{\frac{i\pi}{4}}\begin{bmatrix}1\\0\end{bmatrix}. \quad \text{-i)}$$

The resultant retarded light (50) is reflected by the liquid crystal of the rear cholesteric display (10), which behaves essentially as a circular polariser. Given that the Jones matrix of the rear display is $$\frac{e^{\frac{i\pi}{4}}}{2}\begin{bmatrix}1\\-i\end{bmatrix},$$

the resultant reflected light (51) is described by the equation;

$$\frac{1}{2}\begin{bmatrix}1 & i\\-i & 1\end{bmatrix}e^{\frac{i\pi}{4}}\begin{bmatrix}1\\0\end{bmatrix}=\frac{e^{\frac{i\pi}{4}}}{2}\begin{bmatrix}1\\-i\end{bmatrix}. \quad \text{-ii)}$$

The reflected light (51) is then re-transmitted through the retarder (45) with a further quarter wave retardation with a resultant linearly polarised output given by the equation;

$$e^{\frac{i\pi}{4}}\begin{bmatrix}1 & 0\\0 & -i\end{bmatrix}\frac{e^{\frac{i\pi}{4}}}{2}\begin{bmatrix}1\\-i\end{bmatrix}=\frac{e^{\frac{i\pi}{2}}}{2}\begin{bmatrix}1\\1\end{bmatrix}. \quad \text{-iii)}$$

The light (51) transmitted through the retarder (45) passes again through the TOLED layer (30). As the Jones matrix of the TOLED (30) is the identity matrix $$\begin{bmatrix}1 & 0\\0 & 1\end{bmatrix},$$

the resultant effect of the transmission, as given by the equation;

$$\begin{bmatrix}1 & 0\\0 & 1\end{bmatrix}\frac{e^{\frac{i\pi}{2}}}{2}\begin{bmatrix}1\\1\end{bmatrix}=\frac{e^{\frac{i\pi}{2}}}{2}\begin{bmatrix}1\\1\end{bmatrix}, \quad \text{-iv)}$$

leaves the resultant light (53) unchanged.

The light (53) re-transmitted through the TOLED (30) then passes through the wire grid polariser (44) described by a Jones matrix of $$\begin{bmatrix}0 & 0\\0 & 1\end{bmatrix}$$

with the resultant transmitted light (54) given by the equation;

$$\begin{bmatrix}0 & 0\\0 & 1\end{bmatrix}\frac{e^{\frac{i\pi}{2}}}{2}\begin{bmatrix}1\\1\end{bmatrix}=\frac{e^{\frac{i\pi}{2}}}{2}\begin{bmatrix}0\\1\end{bmatrix}. \quad \text{-v)}$$

The resultant light (54) transmitted through the wire grid polariser (44) preserves all the polarising attributes of each portion of the any image generated on the rear screen (10), maintaining the relative luminosity between the darkened and light areas. In the embodiment shown in FIG. 8, this light (54) then passes through the front screen (20).

However, in alternative embodiments, the combination of the TOLED (30), wire grid polariser (44) and (optionally) the optical retarder (45), collectively forming an illumination assembly (55) may be located in front of a multi-screen display or even used as a transparent illumination means enabling a user to illuminate a scene whilst viewing the scene from the same axis as the illumination source.

The inclusion of the retarder (45) is optional depending on the reflective properties of the rear display (10). The retarder (45) is thus used to correct the oscillation plane of the electric field (i.e., the polarisation) to ensure the eventual transmission through the wire grid polariser (44) is achieved with the minimum of absorption losses.

In the above example, the rear display (10) is a cholesteric transflective liquid crystal, which acts as a circular polariser. Dependent on the polarisation of the incident light (49), the light reflected from the rear screen (10) may be one of the following:
i. the incident light is randomly polarized in which case that which is reflected will be circularly polarized;
ii. the incident light is linearly polarized in which case it will emerge circularly polarized;
iii. the incident light is elliptically polarized in which case it will emerge as elliptically polarized.

The retarder (45) is thus incorporated only if required to alter the polarization orientation of the light reflected from the rear screen (10) before it being transmitted or reflected by the wire grid polariser (44).

Figure 9:
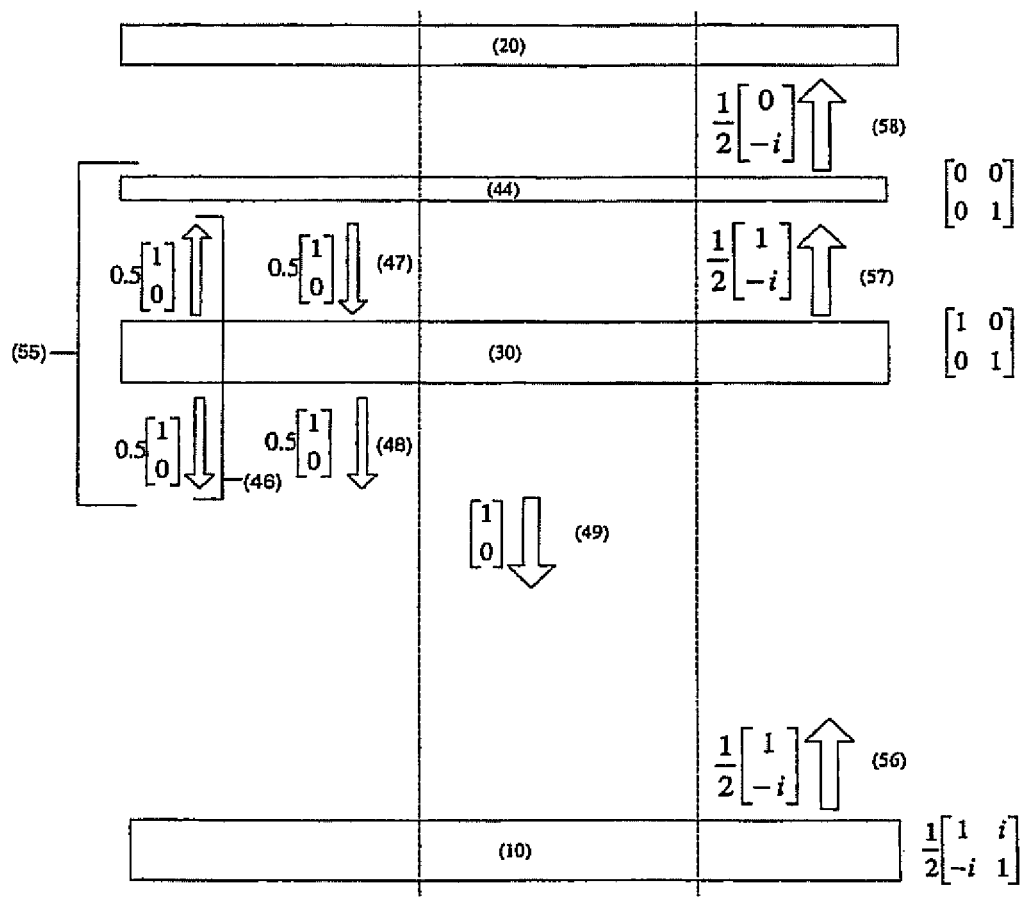
FIG. 9 shows a schematic cross sectional view through a TOLED in accordance with a further preferred embodiment of the present invention

FIG. 9 shows an embodiment of the present invention identical to that shown in FIG. 8, with the exception that the optical retarder (45) is omitted. Like components (10, 20,44, 47) are like numbered. Similarly, the transformation of the light (46, 47, 48, 49) emitted from the TOLED (30), reflected from the wire grid (44), transmitted through the TOLED (30), and that incident on the rear screen (10) is identical to that shown in FIG. 8 with like reference numbering. The Jones vectors associated with the light (46, 47, 48, 49) and the Jones matrices characterizing the front screen (20), rear screen (10), TOLED (30) and wire grid polariser (44) are also identical to the previous embodiment.

Thus, considering the situation following the incidence of light (49) on to the rear screen (10) that has not passed through a retarder (45), the subsequent transitions are as follows;

The incident light (49) characterized by the Jones vector $$\begin{bmatrix} 1 \\ 0 \end{bmatrix}$$

is reflected by rear screen (10) with a resultant transformation given by the equation;

$$\frac{1}{2}\begin{bmatrix} 1 & i \\ -i & 1 \end{bmatrix}\begin{bmatrix} 1 \\ 0 \end{bmatrix} = \frac{1}{2}\begin{bmatrix} 1 \\ -i \end{bmatrix}. \qquad \text{-vi)}$$

The reflected light (56) then passes through the TOLED (30) again. As the Jones matrix of the TOLED (30) is the identity matrix $$\begin{bmatrix} 1 & 0 \\ 0 & 1 \end{bmatrix},$$

the resultant effect of the transmission as given by the equation;

$$\begin{bmatrix} 1 & 0 \\ 0 & 1 \end{bmatrix}\frac{1}{2}\begin{bmatrix} 1 \\ -i \end{bmatrix} = \frac{1}{2}\begin{bmatrix} 1 \\ -i \end{bmatrix}, \qquad \text{-vii)}$$

leaves the resultant light (57) unchanged.

The light (57) transmitted through the TOLED (30) is then transmitted through the wire grid (44) characterized by the Jones matrix $$\begin{bmatrix} 0 & 0 \\ 0 & 1 \end{bmatrix}$$

to the extent given by the equation;

$$\begin{bmatrix} 0 & 0 \\ 0 & 1 \end{bmatrix}\frac{1}{2}\begin{bmatrix} 1 \\ -i \end{bmatrix} = \frac{1}{2}\begin{bmatrix} 0 \\ -i \end{bmatrix}. \qquad \text{-viii)}$$

In accordance with recognised convention, the imaginary component is only considered as a mathematical aid in expressing the polarisation orientation. The resultant output (58) gives a Jones vector of $$\frac{1}{2}\begin{bmatrix} 0 \\ -i \end{bmatrix}$$

in comparison with a Jones vector of $$\frac{e^{\frac{i\pi}{2}}}{2}\begin{bmatrix} 0 \\ 1 \end{bmatrix}$$

for the corresponding light output (54) produced in the embodiment incorporating a retarder (45). This difference is just a phase shift of 180 degrees with respect to the other. Since the eye integrates over time it cannot distinguish this difference, and the resultant luminance of the both embodiments appears the same.

Thus, when using a cholesteric liquid crystal rear display (10), or other display with the same reflective properties, the retarder (45) may be omitted without detriment. If, however, the rear display (10) and/or any additional optical components that may be placed in the light path from the TOLED (30) to the front screen (20) results in a misalignment between the polarisation axis of the wire grid (44) and the light incident on it, the retarder (45) may be used to correct for misalignment.

As visual display unit back lights and other such illumination sources generate heat which may can be difficult to dissipate without constraints on casing design and/or the need for active cooling such as fans. Placing the illumination source forward of the front screen may alleviate such heating issues. Thus, an illumination assembly may, for example, be used with single screen displays to replace backlights in applications such as notebook computers and the like.

In such instances, the wire grid polariser (44) is formed on the inner surface of a substrate, or between substrate layers in a sandwich construction, to protect the delicate wire grid.

Aspects of the present invention have been described by way of example only and it should be appreciated that modifications and additions may be made thereto without departing from the scope thereof.

Physical Objects Interposed Within a 3D Volumetric Space

Embodiments of the present invention are implemented within displays having two or more at least partially overlapping display screens located in distinct focal planes, such as, those displays previously described herein in FIGS. 1-9, and other single or multi-layer displays using various forms of illumination (e.g., backlight and/or emissive layers located between the displays, etc.).

Figure 10:
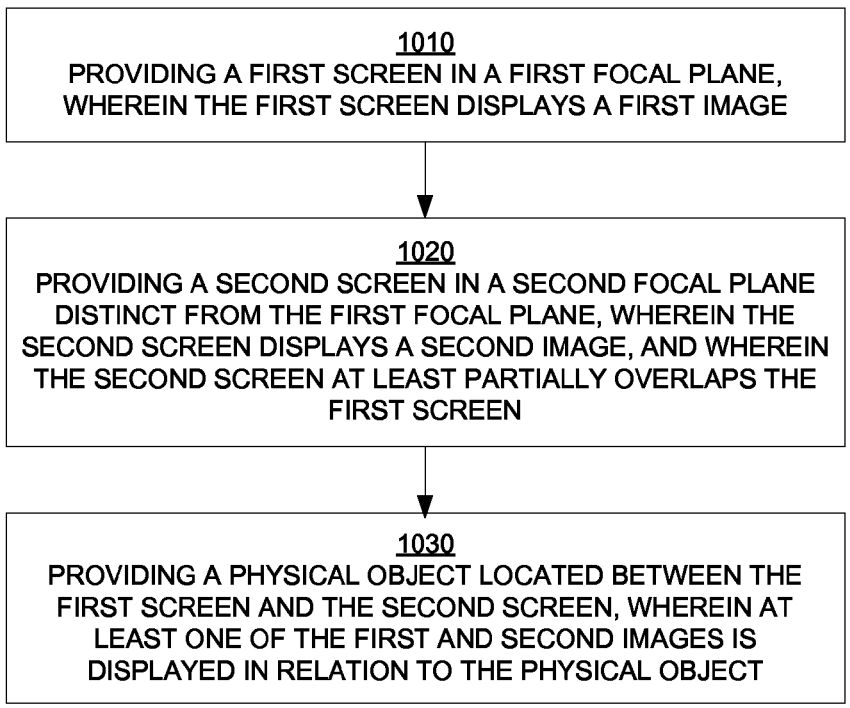
FIG. 10 is a flow diagram illustrating a method for integrating a physical object within a visual display unit having two or more screens, in accordance with one embodiment of the present disclosure.

FIG. 10 is a flow diagram 1000 illustrating a method for integrating one or more physical objects within a visual display unit having two or more screens, such as, a multi-layered display, in accordance with one embodiment of the present disclosure. For example, embodiments of the present invention are applicable to a variety of visual display units including portable and/or hand held computing means, such as, mobile phones, watches, calculators, data loggers, and the like. Still other embodiments of the present invention are equally applicable larger visual display units, such as, instrument panels, vehicle displays, gaming devices, television screens, computer screens, and the like.

At 1010, the method includes providing a first screen in a first focal plane of the visual display unit, wherein said first screen displays a first image. At 1020, the method includes providing a second screen in a second focal plane of the visual display unit, wherein the second screen displays a second image. The focal planes are distinct, such that the images on the two focal planes provide a three-dimensional volumetric space within which the images are projected. In one embodiment the images are displayed in a manner providing an overall image that has depth, real and enhanced, when viewed by a viewer.

In one embodiment, the visual display unit comprises two or more screens, each displaying a corresponding image. One or more of the screens is at least partially transparent. In that manner, images from rearward screens are viewable through at least one or more partially transparent forward screens.

In one embodiment, the first screen and the second screen partially overlap. In that manner, the images on the two screens are configurable to interact with each other to provide an enhanced three-dimensional effect to a viewer. In another embodiment, the first screen and the second screen do not overlap. Images on the two screens provide a three-dimensional effect to viewer by virtue of the display screens lying on different focal planes. However the images may not necessarily interact with each other, and may provide images that are independent of each other.

At 1030, the method includes providing a physical object in a location that is related to the first screen and the second screen. Further, at least one of the first and second images is displayed in relation to or in conjunction with the physical object. For instance, at least one of the first and second images is able to interact with some aspect of the physical object. For instance, an image is able to interact with the presence of the physical object; is able to interact with the location of the physical object; is able to interact with the movement of the physical object; is able to interact with the disappearance of the physical object; and/or various other aspects of the physical object.

In one embodiment, the physical object is located behind the first screen and the second screen, wherein at least one of said first and second images is displayed in relation to said physical object. In other embodiments, the physical object is located between the first and second screens, with one or more additional screens arranged in some configuration in relation to the first and second screens, including behind the screens, between the screens, in front of the screens, or some combination thereof. In another embodiment, the physical object is located in front of the first and second screens. In still other embodiments, the physical object is located in front of the first and second screens, with one or more additional screens arranged in some configuration in relation to the first and second screens, including behind the screens, between the screens, in front of the screens, or some combination thereof. In another embodiment, the physical object is located behind the first and second screens. In still other embodiments, the physical object is located behind the first and second screens, with one or more additional screens arranged in some configuration in relation to the first and second screens, including behind the screens, between the screens, in front of the screens, or some combination thereof.

In one embodiment, the physical object is partially transparent so that images displayed behind the physical object is viewable through the physical object. In another embodiment, the physical object is opaque. Though the physical object may block images that are displayed behind the object, those images are viewable at least in part because the object may be movable or moving across the display, and/or small in size so that the obstructed portion of images behind the object are negligible.

In one embodiment, the integration of physical objects and two or more display screens creates a multiple or multiplied augmented reality (MAR), wherein multiple display layers displaying digitized information augments and/or modifies reality as provided in the form of one or more physical objects. This use of multiple augmented reality is particularly appealing, because a viewer is presented with a view including a real object. To the viewer, the real object can provide a sense of normalcy or trustworthiness. For instance, a multiple augmented reality display of embodiments of the present invention may include a physical object that includes portions of an analog speedometer, along with additional digitized pieces of information that may or may not be related to the physical object. The viewer inherently trusts the reality aspect of the augmented reality because the viewer is used to analog speedometers. In contrast, the viewer may not inherently trust totally digital speedometers, either because they are new, or may have the perception of failure due to software glitches, non perfect representation of lines at angles (commonly called jaggies), lack of response to the environment, such as reflections, lack of sense of physical continuity, or other personal reasons. As such and because of the physical reality, the viewer may also assess more trustworthiness to the overall, multiple augmented reality provided by the visual display unit.

Figure 11A:
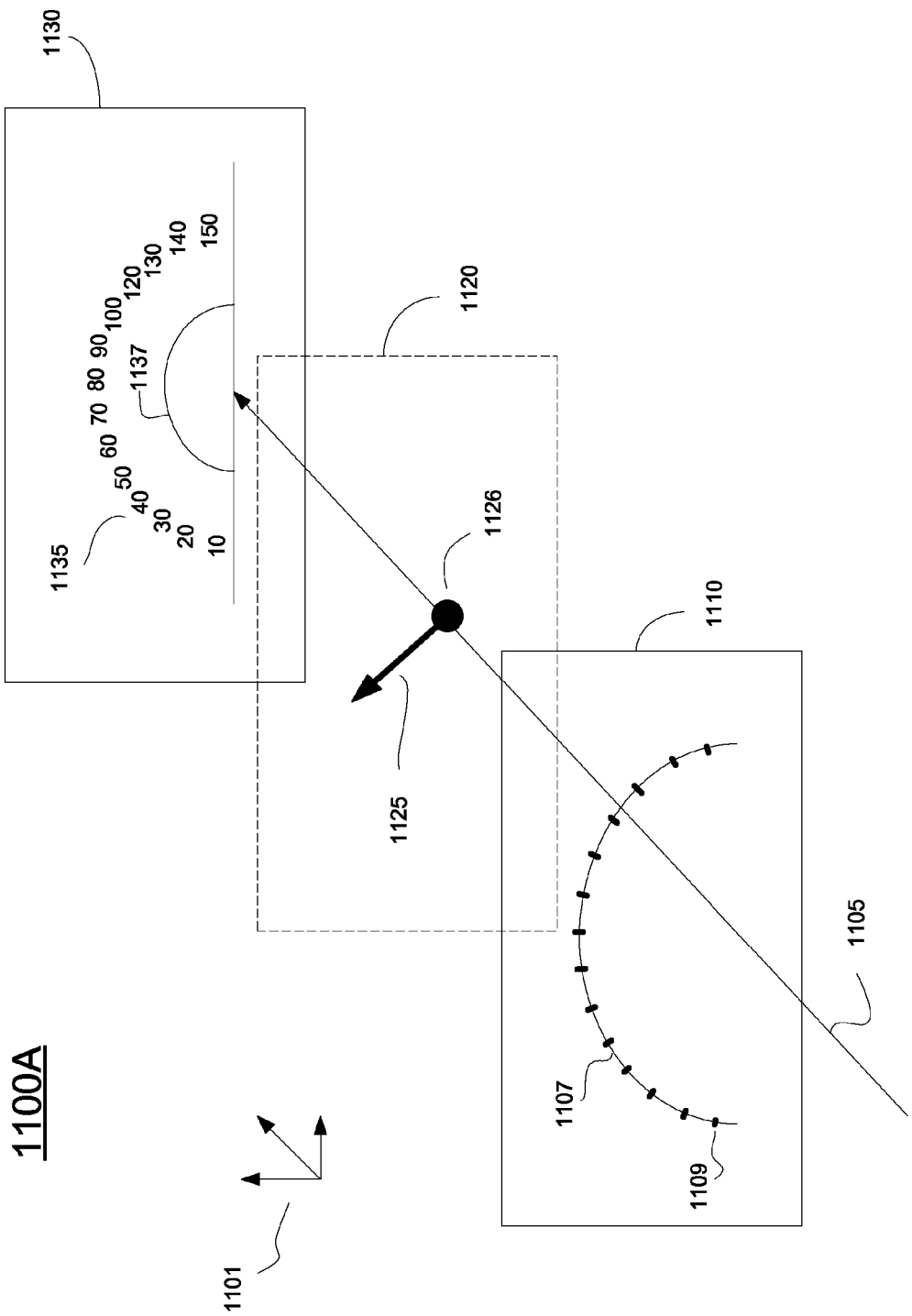
FIG. 11A is an illustration of a physical object placed between two or more displays, in accordance with one embodiment of the present disclosure.

FIG. 11A is an illustration of a physical object placed between two or more displays, in accordance with one embodiment of the present disclosure. As shown, a visual display unit 1100A includes a first screen 1110 and a second screen 1130. As previously described, the visual display unit is comprised of two or more display screens, each configured to display a corresponding image. The images as viewed by a viewer, are configured to create the perception of a three-dimensional image within a three-dimensional space, wherein the 3D image can be real and/or imagined, and the 3D space can also be real and/or imagined.

As shown in FIG. 11A, the visual display unit 1100A includes a first screen 1110 (e.g., display, display screen, etc.) in a first focal plane. For instance, the first focal plane is defined as a plane within a coordinate system 1101. The first screen 1110 and first focal plane is shown in relation to a line-of-sight 1105. For example, the line-of-sight 1105 may show the viewpoint of a viewer when viewing the visual display unit 1100A. The first focal plane may comprise a foreground image of the visual display unit 1100A.

In one embodiment, the first screen 1110 displays a first image. For example, the first image includes a dial 1107. One or more markings 1109 are placed on the dial 1107. As shown, the markings 1109 are equally spaced across the dial 1107, and may be used as a scale. For instance, the markings may show increasing speeds in a speedometer. The markings may be formed on a light pipe, and constructed via the application of white paint or imprinting of extraction features as commonly known in the art.

As shown in FIG. 11A, the visual display unit 1100A includes a second screen 1130 in a second focal plane. For instance, the second focal plane is defined as a plane within the coordinate system 1101. The second focal plane 1130 is distinct from the first focal plane, such that the two focal planes are offset from each other. It is important to note that the multi-layered display unit may comprise two or more display screens, in other embodiments. In one embodiment, the first screen comprises a transparent display in the foreground, and the second screen comprises an opaque display.

In particular, within the visual display unit 1100A, the first screen 1110 and the second screen 1130 are components within a multi-layered display unit, in one embodiment. As such, the first focal plane 1110 and the second focal plane 1130 are approximately in parallel to each other. Also, in one embodiment, the second screen 1130 partially overlaps the first screen 1110. In other embodiments, the two screens do not necessarily overlap. The first image displayed on the first screen 1110 and the second image displayed on the second screen 1130 are configured to give the perception to a viewer of a three-dimensional image, in one embodiment.

In one embodiment, the second screen 1130 displays a second image. For example, the second image includes a series of numbers 1135 that increase from 10 to 150, in units of 10 increments. In addition, the second image includes another dial 1137. The first image and the second image are configured to create the perception of a three-dimensional image. That is, the second screen is configurable to display the second image in response to display of the first image. For example, the first and the second images are configured to create a speedometer. The use of the speedometer image throughout this Application is purely for purposes of illustration. As such, the visual display unit is configurable to create any three-dimensional image, as supported by embodiments of the present invention. For example, the visual display unit may be configured as a gaming console or system, such as, a display on a slot machine, a pinball machine, a ball bearing game machine (e.g., pachinko, etc.) wherein the physical object comprises a spherical ball.

As shown in FIG. 11A, a physical object 1125 is located between the first screen 1110 and the second screen 1130. For instance, the physical object 1125 located on a plane 1120 that is, at least in part, located between the first focal plane and the second focal plane. In another embodiment, the physical object 1125 is located in front of the first screen 1110 and the second screen. In still another embodiment, the physical object 1125 is located behind both the first screen 1110 and the second screen 1130.

For purposes of illustration only, the physical object 1125 is shown as a needle that pivots around a pivot point 1126. For example, the needle as the physical object 1125 is included within the speedometer created by the first image and the second image, previously described. The physical object 1125 may include other times, such as, a beveled edge as part of a hollow cylinder that creates the illusion of a protective case or housing, etc.

In addition, in another embodiment, at least one of the first and second images is displayed in response to a placement of said physical object 1125. That is, the image is displayed to interact with or supplement the physical object 1125. For instance, the image displayed in response to placement of the physical object 1125 is used to augment reality, as presented by the physical object 1125. For instance, the combination of the physical object 1125 and the images displayed in the first screen 1110 and the second screen 1130 provide for an enhanced depth effect. That is, by layering more information within a line of view 1105 across the multiple layers, the viewer is readily able to perceive depth in the three-dimensional volumetric space that is created.

Figure 11B:
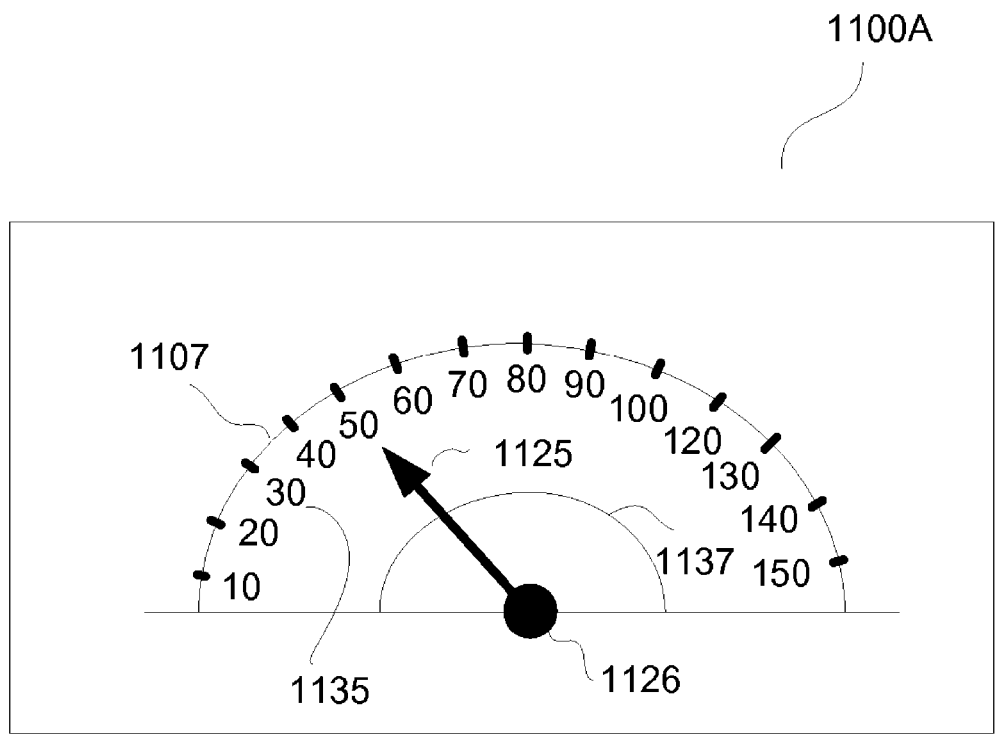
FIG. 11B is an illustration of a physical object placed between two or more displays as shown in FIG. 11A as viewed along a line-of-sight of a viewer, in accordance with one embodiment of the present disclosure.

FIG. 11B is an illustration of a physical object 1125 placed between two or more displays as shown in FIG. 11A, as viewed along a line-of-sight 1105 of a user, in accordance with one embodiment of the present disclosure. As shown, the visual display unit 1100A is presented along the line-of-sight 1105, that provides a viewpoint of a viewer. The overall image presented by the visual display unit 1100A is a three-dimensional image that in combination presents a dial face of a speedometer, and a needle that indicates speed. That is, the first and second images are aligned to create a three-dimensional speedometer. For example, the dial face includes the outer dial 1107 provided by the first screen 1110. The dial face also includes the inner dial 1137 and scalar numbering 1135 provided by the second screen 1130. As such, the first and second images provided by the first screen 1110 and the second screen 1130 are combined to present a three-dimensional dial face. For example, the numbering 1135 are aligned with the markings 1109 on the dial 1107 to create an image of a speedometer. In addition, the needle 1125 is centered within the speedometer image and rotates about point 1126 to indicate a speed reading. That is, at least one of the first and second images is displayed in response to the physical object 1125 (e.g., to create a speedometer). For instance, the needle 1126 is pointing in the vicinity of the number 50, to give an approximate speed of 50.

Figure 11C:
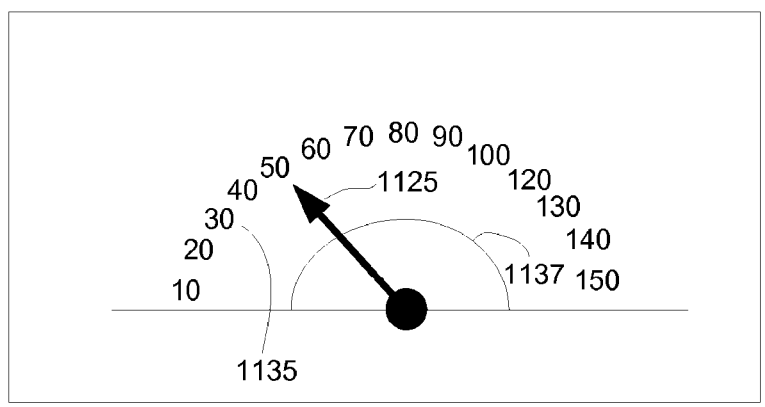
FIG. 11C is an illustration of a physical object placed between two or more displays as shown in FIG. 11A retaining visual depth after a depth cue has been removed, in accordance with one embodiment of the present disclosure.

FIG. 11C is an illustration of the physical object 1125 placed between two or more displays, as shown in FIG. 11A, while retaining visual depth of an overall image (e.g., that shown in FIG. 11B) after a depth cue has been removed, in accordance with one embodiment of the present disclosure. That is, a depth of the overall image may be created or enhanced with a depth cue. For example, the depth cue could be the first image (e.g., the dial 1107 and markings 1109) as displayed on the first screen 1110. Once a depth of the overall image is created, one or more depth cues are removed, while retaining other elements of the overall image. For instance, the numbering 1135, and inner dial 1137 as displayed on the second screen 1130 may be retained, as well as the needle 1125 as the physical object. As such, the overall image of a speedometer, as well as the information conveyed by the speedometer, is still presented to the viewer. In addition, the viewer is able to retain the enhanced perception of depth, as provided by the depth cue or cues, and is able to perceive a three-dimensional speedometer even though portions of the overall image may have been removed. This may allow for purposes of clarity, and/or the introduction of other pieces of information.

Figure 12A:
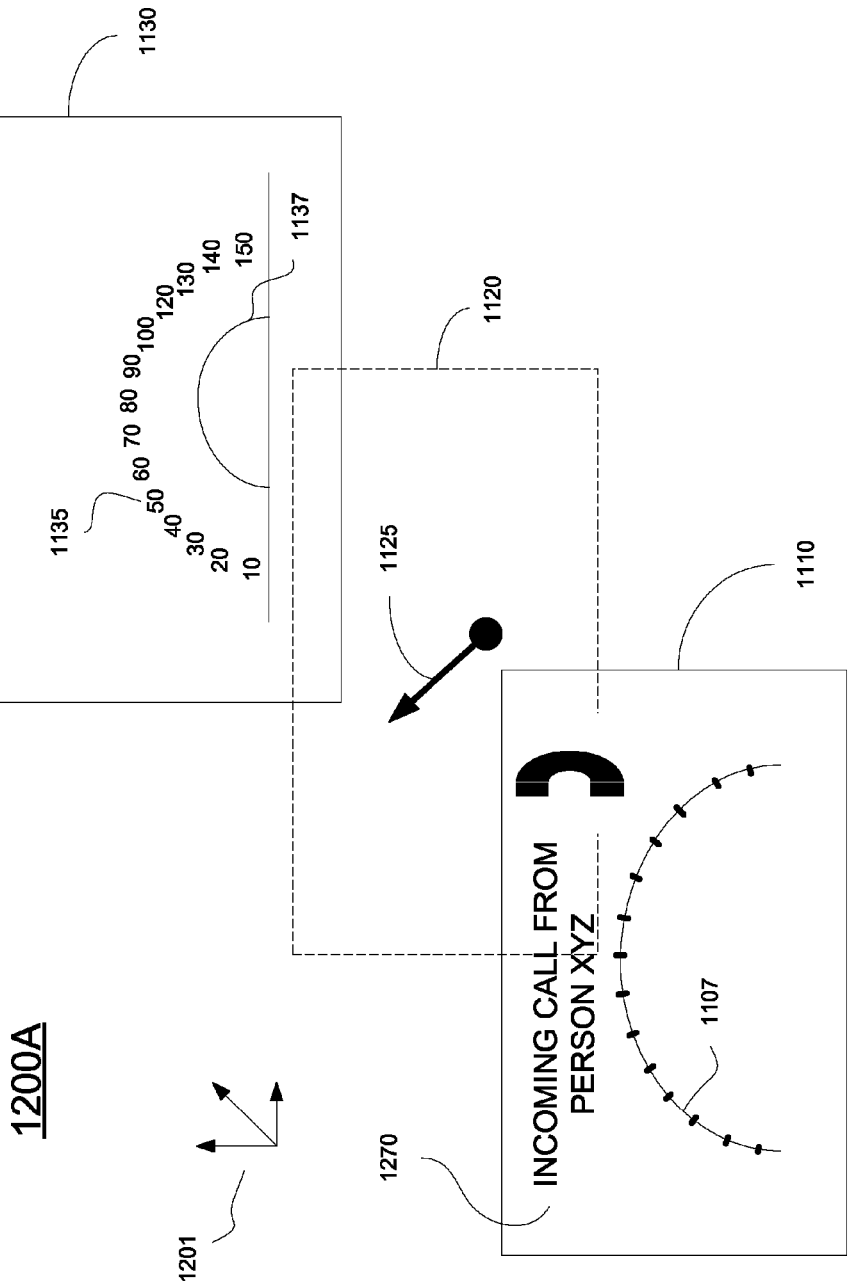
FIG. 12A is an illustration of a physical object placed between two or more displays including information related to the physical object and information not related to the physical object, in accordance with one embodiment of the present disclosure.

FIG. 12A is an illustration of a physical object placed between two or more displays including information related to the physical object and information not related to the physical object, in accordance with one embodiment of the present disclosure. The introduction of information not related to the physical object is presented using the speedometer and images first introduced within FIGS. 11A-C, for purposes of illustration only. Like numbered elements between FIGS. 11A-C and 12A-B are intended to be similarly described.

As shown, a visual display unit 1200A includes a first screen 1110 and a second screen 1230, wherein the visual display unit 1200A is comprised of two or more display screens, each configured to display a corresponding image. The images as viewed by a viewer, are configured to create the perception of a three-dimensional image within a three-dimensional space, wherein the 3D image can be real and/or imagined, and the 3D space can also be real and/or imagined.

As previously described, the visual display unit 1200A generates a three-dimensional overall image, that is a speedometer. The three-dimensional image (e.g., speedometer) is comprised of a first image displayed on a first screen 1110 located in a first focal plane of a coordinate system 1201. The first image comprises a dial 1107, and one or more incremental markings 1109 are placed on the dial 1107. In addition, the first images comprises a notification 1270 that indicates that a phone message is incoming from person XYZ. The three-dimensional image is comprised of a second image displayed on a second screen 1130 located on a second focal plane that is distinct from the first focal plane, such that the two focal planes are approximately parallel to each other with some offset. The second image includes an inner dial 1137, and series of numbers 1135 that increase from 10 to 150, in units of 10 increments, and are configured to align with the markings 1109 when viewed by a viewer. The first image and the second image are configured to create the perception of a three-dimensional image, such as, a speedometer. In addition, a physical object 1125 is located between the first screen 1110 and the second screen 1130, such as, in plane 1120, that is, at least in part, located between the first focal plane and the second focal plane.

In one embodiment, the second screen 1130 partially overlaps the first screen 1110. In other embodiments, the two screens do not necessarily overlap. The visual display unit 1200A unit may comprise two or more display screens, in other embodiments. In particular, within the visual display unit 1200A, the first screen 1110 and the second screen 1130 are components within a multi-layered display unit, in one embodiment.

The images forming the speedometer are related to each other, and to the placement and movement of the physical object or needle 1125. That is, the overall three-dimensional image of a speedometer is created from related images displayed on one or more display screens that are displayed in relation to the physical object 1125. In one embodiment, at least one of the images on the first screen 1110 or second screen 1130 is displayed in response to placement, of the physical object. For example, the images are displayed in relation to the physical object 1125 to create a three-dimensional speedometer.

In another embodiment, at least one of the images on the first screen 1110 or second screen 1130 is dynamically displayed in relation to the movement of the physical object 1125. For example, the numbering 1135 on the second screen 1130 on the speedometer may be dynamically modified to show where the needle is currently pointing. That is, the number 50 may be highlighted (e.g., bolded, or put in larger font) to indicate that the needle is pointing to the vicinity of the number 50. In addition, the dial 1107 on the first screen 1110 may also be enlarged, thereby creating a magnifying effect focusing on the portion of the speedometer where the needle is pointing. In that case, both the first image and the second image are displayed in relation to position and/or position of the physical object 1125.

In another embodiment, the first screen 1110 may dynamically project a colored image onto the needle to indicate that the needle is pointing in the vicinity of the number 50. The back-light may be lensed or collimated to assist with this projection in this region. In addition the needle may have a layer of variably translucent material between one or several transparent electrodes so that the needle may respond to changes in the underlying images. For example if it was desired that the display unit 1200A was to be temporarily re-purposed to show navigation data only, the needle may be set to transparent mode so that it was rendered invisible to the viewer.

In another embodiment, the needle may be a translucent light-pipe. Light is emitted into the end of the needle by means of an light emitting diode (LED), organic light emitting diode (OLED), or similar source. The needle then has light extracting features along its length or may be so shaped that some light exceeds the critical angle and is projected towards the viewer through the second screen 1130. The needle may change its luminance depending on the time of day by varying the strength of the incident LED or OLED or similar source.

Additionally if the color of the LED or OLED or similar source can be altered, for example by varying the relative strength of three individually colored dies the needle could also change color.

In another embodiment the needle may contain an array of monochrome or multicolored LEDS, OLEDS or quantum dots or other light-generating means. The array of dots would be individually addressable and the needle capable of moving quickly. For example if it was desired to temporarily re-purpose the needle from indicating the engine frequency to showing a warning about an upcoming traffic jam, the needle would then move quickly from side to side, and the LEDs would be addressed to show a portion of the desired warning or image depending on the position. The viewers persistence of vision would then render the image complete if the needle was moving at a high enough frequency, normally more than 15 Hz. The intended image would appear to float between the first 1110 and second screen 1130.

The first and second images are dynamically generated in response to the movement of the physical object, in another embodiment. For example, a visual display unit may be configured as a pachinko machine, wherein one or more ball bearings move across a playing surface and fall into holes, thereby generating points. As the ball moves around, the images displayed on the corresponding screens may react to the movement. For instance, if the movement indicates something positive for the player, the images may show an uplifting overall image (e.g., 2D, 3D, etc.). on the other hand, if the movement indicates something negative for the player, the images may show a disappointing image. In either case, the images are displayed in reaction to the movement of the physical object.

Additionally images may be projected onto the physical object, for example a character may projected onto the ball, and that character may change depending on game play.

In addition, the portion of the first image is not related to the physical object 1125 and/or the second image. For example, the notification 1270 alerts that viewer that "INCOMING CALL FROM PERSON XYZ." As such, the notification is not related to speed information provided by the three-dimensional speedometer, but provides additional and separate information to the viewer.

Figure 12B:
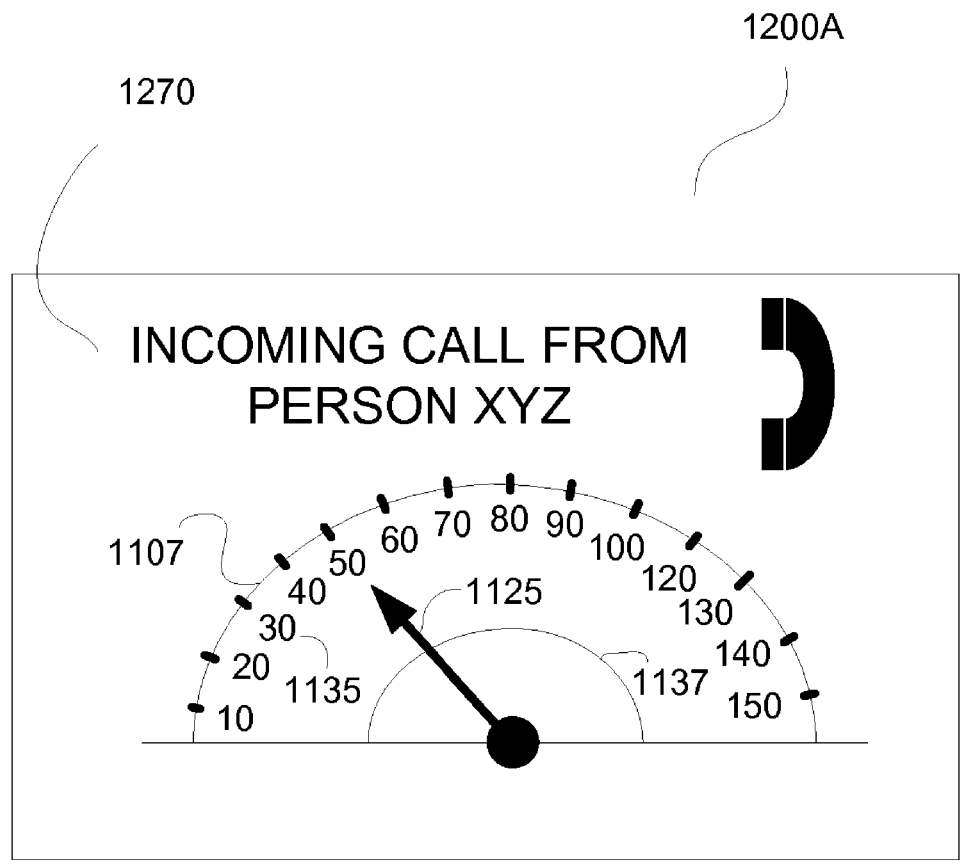
FIG. 12B is an illustration of a physical object placed between two or more displays as shown in FIG. 12A as viewed along a line-of-sight of a viewer, in accordance with one embodiment of the present disclosure.

FIG. 12B is an illustration of a physical object 1125 placed between two or more displays as shown in FIG. 12A as viewed along a line-of-sight (not shown) of a user, wherein at least a portion of an image used to generate a three-dimensional volumetric space is not related to the physical object, and/or not related to an overall three-dimensional image created in the three-dimensional volumetric space, in accordance with one embodiment of the present disclosure. As shown, the visual display unit 1200A provides a viewpoint of a viewer, such as, a straight on view.

The overall image presented by the visual display unit 1200A includes a three-dimensional image that presents a dial face of a speedometer, and a needle that indicates speed. That is, the first and second images are combined and aligned to create a three-dimensional speedometer, wherein the dial face includes the outer dial 1107 provided by the first screen 1110, and includes the inner dial 1137 and scalar numbering 1135 provided by the second screen 1130. More particularly, the numbering 1135 is aligned with the markings 1109 on the dial 1107 to create an image of a speedometer, and the physical object 1125 (e.g., needle) is centered within the speedometer image and rotates to indicate a speed reading.

In addition, the overall image presented by the visual display unit 1200A includes other information that is not related to other information (e.g., the three-dimensional speedometer). That is, the visual display unit 1200A may display two or more separate pieces of information. As shown, visual display unit 1200A includes notification 1270 that is displayed in conjunction with the speedometer. In one embodiment, the different information are not overlapped, such that notification 1270 is displayed such that there is no overlap with the speedometer. In that manner, the viewer is able to view both pieces of information without any interference from the images.

Figure 13A:
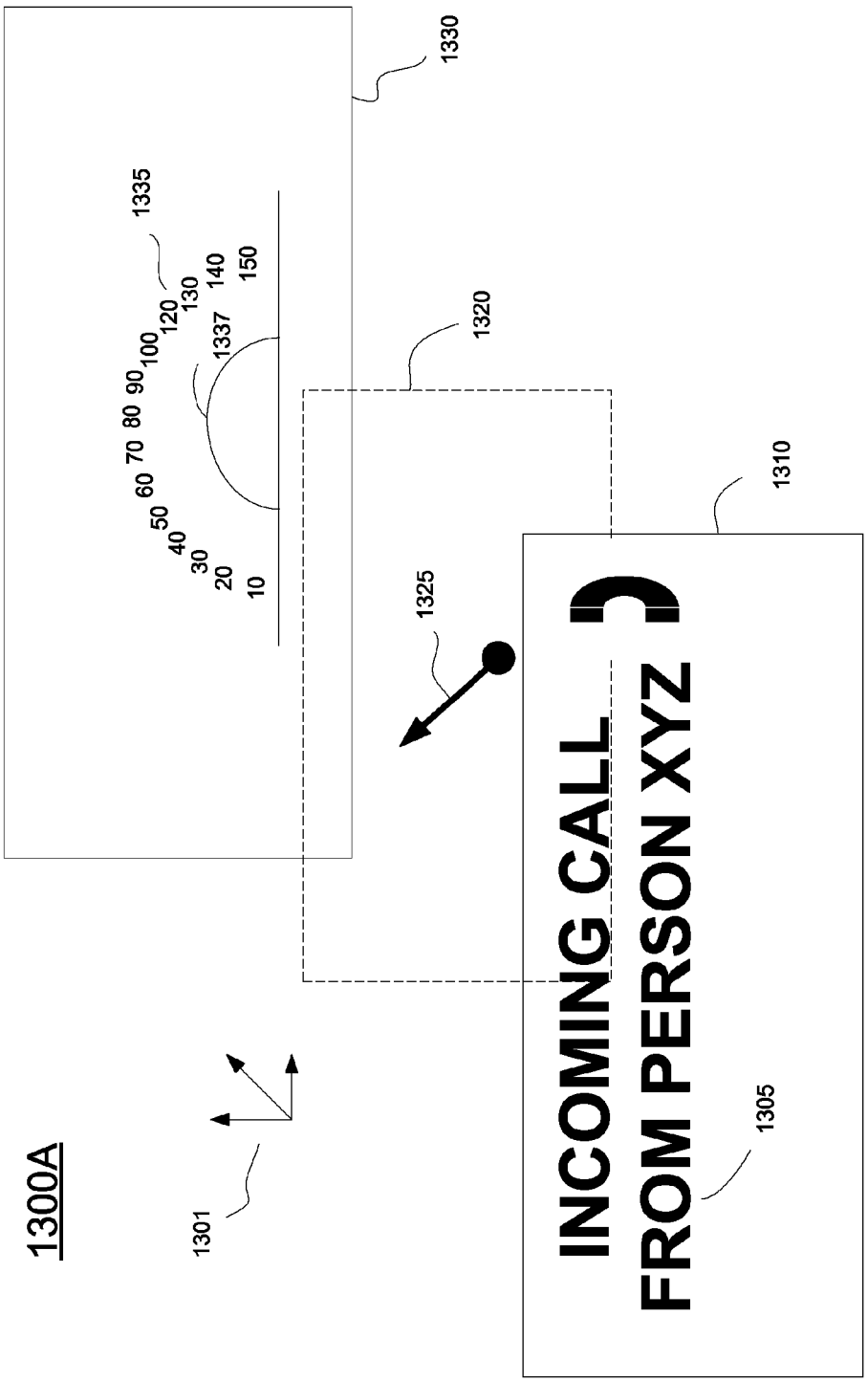
FIG. 13A is an illustration of a physical object placed between two or more displays including one display having information related to the physical object and a second display having information unrelated to the physical object, in accordance with one embodiment of the present disclosure.

In another embodiment, separate pieces of information that are unrelated are overlapped as displayed in a visual display unit. For example, FIG. 13A is an illustration of a physical object placed between two or more displays including one display having information related to the physical object and a second display having information unrelated to the physical object, in accordance with one embodiment of the present disclosure.

As shown, a visual display unit 1300A includes a first screen 1310 and a second screen 1330, wherein the visual display unit 1300A is comprised of two or more display screens, each configured to display a corresponding image. The images as viewed by a viewer, are configured to create the perception of a three-dimensional image within a three-dimensional space, wherein the 3D image can be real and/or imagined, and the 3D space can also be real and/or imagined.

The visual display unit 1300A includes a first screen 1310 located on a first focal plane of a coordinate system 1301. The first screen 1310 displays a first image that comprises a notification 1305, that alerts a viewer that an incoming call is from Person XYZ.

In addition, the visual display unit 1300A generates a three-dimensional image. For purposes of illustration, as shown in FIG. 13A, the three-dimensional image is a speedometer. The three-dimensional image (e.g., speedometer) is comprised of a second image displayed on a second screen 1230 located in a second focal plane of coordinate system 1301. The second focal plane is distinct from the first focal plane, such that the two focal planes are approximately parallel to each other with some offset. The second image includes an inner dial 1337, and series of numbers 1335 that increase from 10 to 150, in units of 10 increments, such as, those used in a scale indicating speed. In addition, a physical object 1325 is located between the first screen 1310 and the second screen 1330, such as, in plane 1320, that is, at least in part, located between the first focal plane and the second focal plane. As a result, the second image on the second display 1330 is displayed in relation to the physical object 1325 to provide a three-dimensional speedometer as viewed by a viewer. An enhanced view of the speedometer may also be provided by using a depth cue, at least for a short period of time, as previously described. In that case, the viewer is able to perceive more depth in the three-dimensional overall image, even though the depth cue may be removed.

Figure 13B:
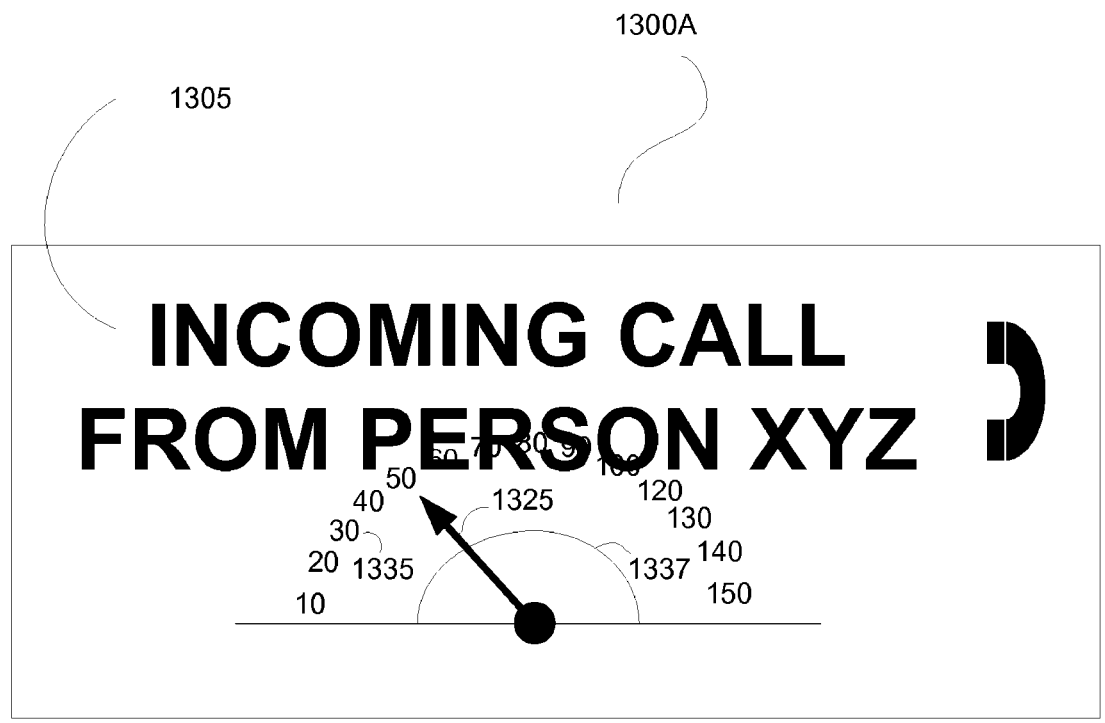
FIG. 13B is an illustration of a physical object placed between two or more displays as shown in FIG. 13A as viewed along a line-of-sight of a viewer, in accordance with one embodiment of the present disclosure.

FIG. 13B is an illustration of a physical object placed between two or more displays as shown in FIG. 13A as viewed along a line-of-sight of a user, wherein the different and unrelated pieces of information are at least partially overlapped when viewing an overall three-dimensional image created in a three-dimensional volumetric space, in accordance with one embodiment of the present disclosure. As shown, the visual display unit 1300A provides a viewpoint of a viewer, such as, a straight on view.

The overall image presented by the visual display unit 1300A includes a three-dimensional image that presents a dial face of a speedometer, and a needle that indicates speed. That is, the inner dial 1337 and numbering 1335 of the second image of the second display and an aligned physical object 1325 are combined and aligned to create a three-dimensional speedometer that gives a speed reading.

In addition, the overall image presented by the visual display unit 1300A includes other information that is not related to other information (e.g., the three-dimensional speedometer). That is, the visual display unit 1300A includes notification 1370 that is displayed in conjunction with the speedometer. In one embodiment, the different information is at least partially overlapped, such that the notification 1370 may overlay portions of the speedometer. In that case, the speedometer may be de-emphasized through dimming or change of size to allow the viewer to focus on the more urgent notification message 1370. In that manner, the viewer is able to view both pieces of information without interruption.

Figure 14A:
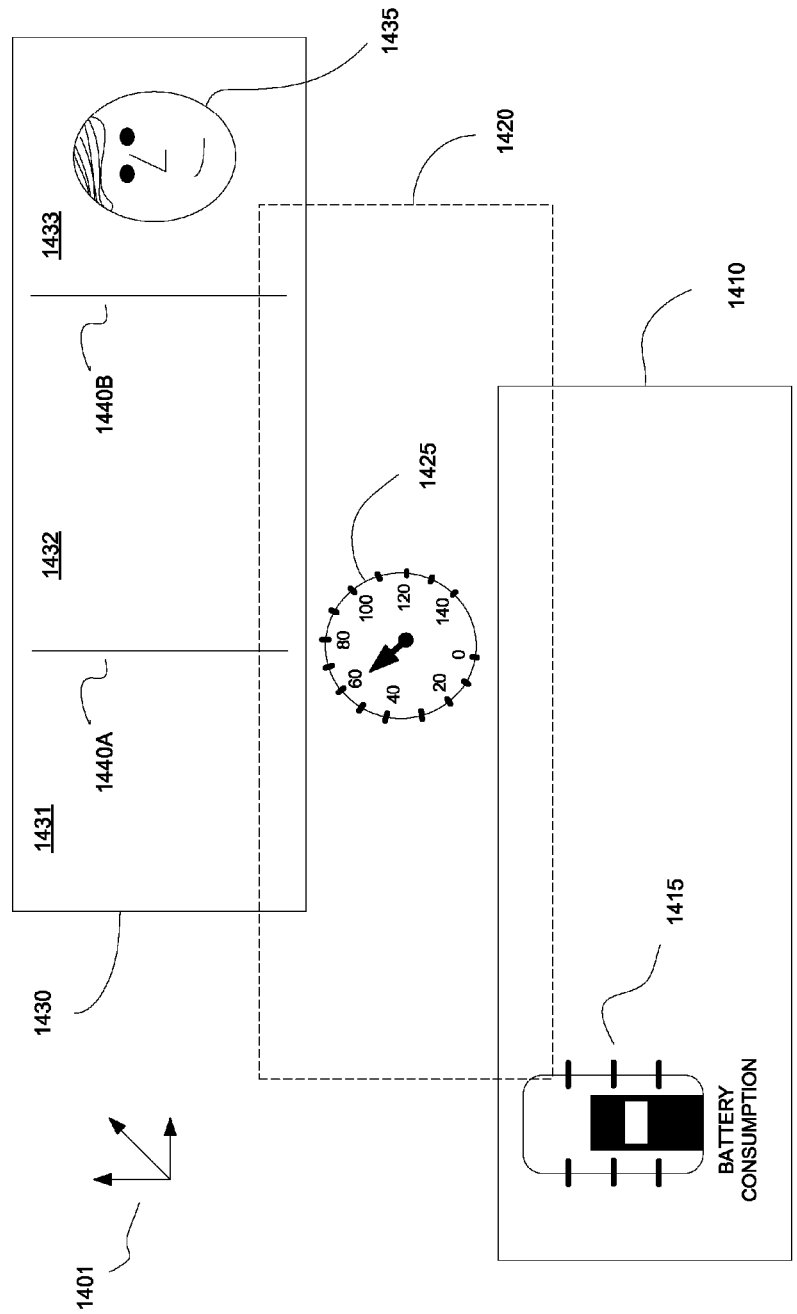
FIG. 14A is an illustration of a physical object placed between two or more displays such that multiple items of information are displayed separately each in different layers, in accordance with one embodiment of the present disclosure.

FIG. 14A is an illustration of a physical object placed between two or more displays such that multiple items of information are displayed separately each in different layers, in accordance with one embodiment of the present disclosure. More particularly, the visual display unit 1400A includes various pieces of information each displayable at a corresponding layer, wherein the pieces of information are separated from each other when displayed.

As shown, visual display unit 1400A includes a first screen 1410 and a second screen 1430. As previously described, the visual display unit is comprised of two or more display screens, each configured to display a corresponding image. In the example provided in FIG. 14A, each display screen is configured to display a different and unrelated image, in one embodiment. In other embodiment, the display screens may display related information, as previously described. The images as viewed by a viewer, are configured to create the perception of a three-dimensional layered image within a three-dimensional space, wherein the 3D image can be real and/or imagined, and the 3D space can also be real and/or imagined. That is, the viewer is able to view different pieces of information at different physical layers, as is shown in FIG. 14A.

More particularly, the visual display unit 1400A includes a first screen 1410 in a first focal plane, such as, that defined within a coordinate system 1401. The first focal plane may comprise a foreground image of the visual display unit 1400A.

In one embodiment, the first screen 1410 displays a first image. For example, the first image includes a battery consumption indicator 1415. In particular, the image provides information to a viewer as to remaining life of a battery. Following the example of an automotive display as the visual display unit 1400A, the battery indicator 1415 may be associated with the battery life of an electric or hybrid vehicle, and indicates that the battery system has more than 50 percent battery life.

As shown in FIG. 14A, the visual display unit 1400A includes a second screen 1430 in a second focal plane that is distinct from the first focal plane, such that the two focal planes are offset from each other. It is important to note that the multi-layered display unit 1400A may comprise two or more display screens, in other embodiments. In one embodiment, the visual display unit 1400 may comprises a first screen 1410 and a second screen 1430 that are components within a multi-layered display unit. As such, the first focal plane 1110 and the second focal plane 1130 are approximately in parallel to each other. Also, in one embodiment, the second screen 1430 partially overlaps the first screen 1410. In other embodiments, the two screens do not necessarily overlap.

In one embodiment, the second screen 1430 displays a second image. For example, the second image may be a rendering, video stream of a person, or some other visual representation of a person or character. The second image may be provided in conjunction with a video conference held between the viewer and the person displayed in the second image on second screen 1430.

In one embodiment the first screen displays a first image. A collimated or lensed back-light projects through the first image layer onto a translucent, or selectively translucent object that has a surface shape similar to the image being projected. For example if the projected image was a face, then the translucent object may have an ellipsoid shape that more closely represents a human face in 3D space.

In addition, the second screen 1430 includes vertical separators 1440A and 1440B. These vertical lines help to demarcate and separate three different areas of the visual display unit 1400A, when viewed by a viewer.

As shown further in FIG. 14A, a physical object 1425 is located between the first screen 1410 and the second screen 1430. For instance, the physical object 1425 is located on a plane 1420 that is, at least in part, located between the first focal plane and the second focal plane. In another embodiment, the physical object 1425 is located in front of the first screen 1410 and the second screen 1430. In still another embodiment, the physical object 1425 is located behind both the first screen 1410 and the second screen 1430.

As shown in FIG. 14A, the physical object comprises a speedometer that includes a housing, a dial display, numbering and markings to indicate speed. In one embodiment, the physical object is three-dimensional. In another embodiment, the physical object is two-dimensional.

FIG. 14B is an illustration of a physical object 1425 placed between two or more displays as shown in FIG. 14A, along a line-of-sight (not shown) of a viewer, such that each item of information is separated from other items of information, in accordance with one embodiment of the present disclosure. As shown, the different and unrelated pieces of information do not overlap when viewing the overall three-dimensional image created by layering information in a three-dimensional volumetric space. As shown, the visual display unit 1400A provides a viewpoint of a viewer, such as, a straight on view.

The overall image presented by the visual display unit 1400A is separated into three sections: a first section 1431, a second section 1432, and a third section 1433. The first section 1431 includes an image of the battery consumption indicator 1415. The second section 1432 includes the physical object, or speedometer 1425. The third section 1433 includes the video stream 1435 of a person participating in a video conference. As shown, the three different sections includes objects and/or images that are separated from each other. In that manner, the different pieces of information do not overlap, and provide unobstructed views of each piece of information for a viewer.

FIG. 14C is an illustration of a physical object 1425 placed between two or more displays as shown in FIG. 14A, along a line-of-sight (not shown) of a viewer, such that each item of information is separated from other items of information, but with a different arrangement than that shown in FIG. 14B, in accordance with one embodiment of the present disclosure. That is, at one moment in time, the visual display unit 1400A may have one configuration (e.g., the configuration found in FIG. 14B), while at another moment in item, the visual display unit 1400A may have a different configuration (e.g., the configuration found in FIG. 14C). As such, the visual display unit is able to reconfigure the ordering of images and objects associated with each section 1431, 1432, and 1433.

For instance, as shown in FIG. 14C, the overall image presented by the visual display unit 1400A includes the physical object, or speedometer 1425 in the first section 1431. That is, the physical object 1425 is moved in relation to the other images to be shown in the first section 1431, as viewed by a viewer. The second section 1432 includes the video stream 1435 of a person participating in a video conference. That is, the second screen 1430 is configured to display the image of the video stream 1435 in the first section 1431, as shown in FIG. 14C, instead of the third section 1433 as shown in FIGS. 14A-B. The third section 1433 includes the image of the battery consumption indicator 1415. That is, the first screen 1410 is configured to display the image of the battery consumption indicator 1415 in the third section 1433 (as shown in FIG. 14C), instead of the first section 1431 (as shown in FIGS. 14A-B).

Figure 14D:
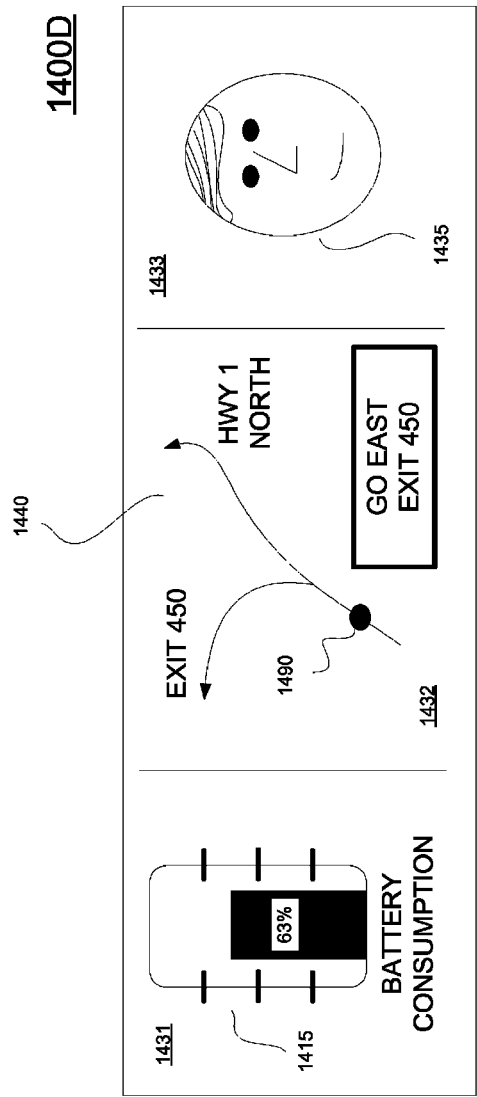
FIG. 14D is an illustration of a physical object placed between two or more displays as shown in FIG. 14A, along a line-of-sight of a viewer, such that each item of information is separated from other items of information, but with the physical object removed from the display, in accordance with one embodiment of the present disclosure.

FIG. 14D is an illustration of a physical object (e.g., object 1425) placed between two or more displays as shown in FIG. 14A, along a line-of-sight of a viewer, such that each item of information is separated from other items of information, but with the physical object removed from the display, in accordance with one embodiment of the present disclosure. That is, a viewer may at one time be viewing the overall image as displayed in FIG. 14B, with the battery consumption indicator 1415 in the first section 1431, and the video stream of a person in a video conference 1435 in the third section 1433. The physical, speedometer 1425 is located in the second section 1432. At a different time, such as a later time, the physical object 1425 is removed from the overall image as viewed by a viewer. A replacement image takes the place of the physical object 1425, in one embodiment. No replacement image may also be generated in other embodiments, such that one section remains empty, or the other two sections are expanded to fill the overall image without any gaps.

For example, as shown in FIG. 14D, the overall image presented by the visual display unit 1400A includes the battery consumption indicator 1415 in the first section 1431, and the video stream 1435 of a person participating in a video conference in the third section 1433. In addition, the middle or second section 1432 now displays a new image of a map 1440, such as a global positioning satellite (GPS) supported map that is continually updated according to the position 1490 of the user.

Figure 15:
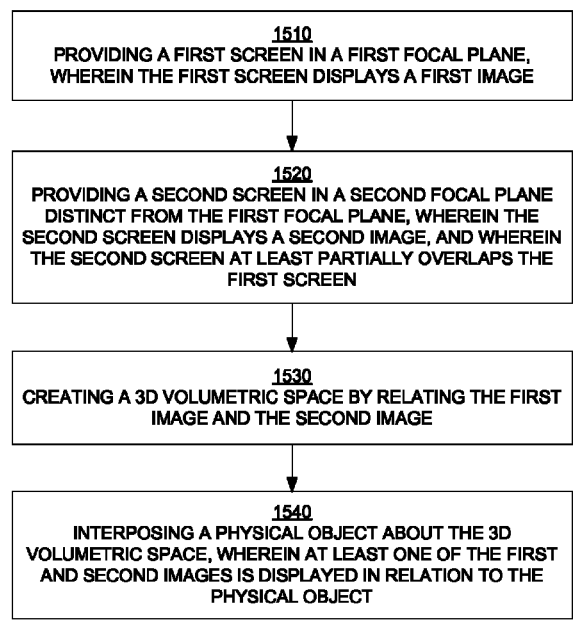
FIG. 15 is a flow diagram illustrating a method for integrating a physical object within a three-dimensional volumetric space defined by a multi-layered display, in accordance with one embodiment of the present disclosure.

FIG. 15 is a flow diagram 1500 illustrating a method for integrating a physical object within a three-dimensional volumetric space defined by a multi-layered display having two or more display screens, in accordance with one embodiment of the present disclosure.

At 1510, the method includes providing a first screen in a first focal plane of the visual display unit, wherein said first screen displays a first image. At 1520, the method includes providing a second screen in a second focal plane of the visual display unit, wherein the second screen displays a second image. The focal planes are distinct, such that the images on the two focal planes provide a three-dimensional volumetric space within which the images are projected. In one embodiment the images are displayed in a manner providing an overall image that has depth, real and enhanced, when viewed by a viewer.

In one embodiment, the visual display unit comprises two or more screens, each displaying a corresponding image. One or more of the screens is at least partially transparent. In that manner, images from rearward screens are viewable through at least one or more partially transparent forward screens. Further, in one embodiment, the first screen and the second screen partially overlap.

At 1530, the method includes creating a three-dimensional volumetric space by relating the first image and the second image. In that manner, the images on the two screens are configurable to interact with each other to provide an enhanced three-dimensional effect to a viewer. In another embodiment, the first screen and the second screen do not overlap. Images on the two screens provide a three-dimensional effect to viewer by virtue of the display screens lying on different focal planes. However the images may not necessarily interact with each other, and may provide images that are independent of each other.

At 1540, the method includes interposing a physical object about the three-dimensional volumetric space, wherein at least one of the first and second images is displayed in relation to or in conjunction with the physical object. For instance, at least one of the first and second images is able to interact with some aspect of the physical object, such as, interacting with the presence of the physical object; interacting with the location of the physical object; interacting with the movement of the physical object; interacting with the disappearance of the physical object; and/or various other aspects of the physical object.

The physical object is located about the three-dimensional volumetric space. For example, in one embodiment, the physical object is located in front of the first and second screens, wherein at least one of said first and second images is displayed in relation to said physical object. In other embodiments, the physical object is located between the first and second screens, with one or more additional screens arranged in some configuration in relation to the first and second screens, including behind the screens, between the screens, in front of the screens, or some combination thereof. In another embodiment, the physical object is located behind the first and second screens. In still other embodiments, one or more additional screens may be located in front of, or behind the physical object.

Thus, according to embodiments of the present disclosure, systems and methods are described providing for video enabled two-factor authentication including a human implemented video authentication of agents located at a remote workstation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A visual display unit, comprising:
a first screen in a first plane, wherein said first screen displays a first image;
a second screen in a second plane distinct from said first plane,
wherein each of said first and second screens comprises a liquid crystal inclusive display screen, and wherein said second screen displays a second image, and wherein said second screen at least partially overlaps said first screen;

a physical object located between said first screen and said second screen, wherein at least one of said first and second images is displayed in response to a placement of said physical object; and an emissive layer comprising a sheet provided between said first screen and said second screen and configured to provide light to said first screen and said physical object.

2. The visual display unit of claim 1, wherein said first screen is configurable to display said first image in response to movement of said physical object.

3. The visual display unit of claim 2, wherein said second screen is configurable to display said second image in response to display of said first image.

4. The visual display unit of claim 2, wherein said second screen is configurable to display said second image in response to movement of said physical object.

5. The visual display unit of claim 1, wherein said physical object is configurable to move in response to at least one of said first image and second image.

6. The visual display unit of claim 1, wherein said physical object is opaque.

7. The visual display unit of claim 1, wherein said physical object is transparent.

8. The visual display unit of claim 1, wherein said physical object comprises a metal sphere.

9. The visual display unit of claim 1, wherein said physical object comprises a needle.

10. The visual display unit of claim 1, wherein said first plane comprises a foreground.

11. The visual display unit of claim 10, wherein said first screen comprises a transparent display, and wherein said second screen comprises an opaque display.

12. The visual display unit of claim 1, wherein the emissive layer is a light guide.

13. A method for adapting a visual display comprising:
providing a first screen in a first plane, wherein said first screen displays a first image;
providing a second screen in a second plane distinct from said first plane, wherein said second screen displays a second image, and wherein said second screen at least partially overlaps said first screen;
wherein each of said first and second screens comprises a liquid crystal based screen;
providing a physical object located between said first screen and said second screen, wherein at least one of said first and second images is displayed in relation to said physical object; and providing an emissive layer comprising a sheet provided between said first screen and said second screen and configured to provide light to said first screen and said physical object.

14. The method of claim 13, further comprising: displaying said first image on said first screen in response to movement of said physical object.

15. The method of claim 14, further comprising: displaying said second image on said second screen in response to display of said first image.

16. The method of claim 14, further comprising: displaying said second image on said second screen in response to movement of said physical object.

17. The method of claim 13, further comprising: moving said physical object in response to at least one of said first image and second image.

18. A display comprising:
a first display screen in a first plane, wherein said first screen is configured to display a first image;
a second display screen in a second plane distinct from said first plane,
wherein each of said first and second screens comprises a liquid crystal inclusive display screen, and wherein said second display screen is configured to display a second image, and wherein said second display screen at least partially overlaps said first display screen;
a physical object located between said first display screen and said second display screen, wherein at least one of said first and second display screens is configured to display an image related to said physical object; and
an emissive layer comprising a sheet provided between said first display screen and said second display screen and configured to provide light to said first screen and said physical object.

19. The display of claim 18, wherein the emissive layer is a light guide.

20. The display of claim 18, wherein said first screen is configured to display the first image in response to movement of said physical object.

21. The display of claim 18, wherein the physical object is configured to move in response to at least one of the first image and the second image.

22. The display of claim 18, wherein said physical object comprises a metal sphere.

23. The display of claim 18, wherein said physical object comprises a needle.

* * * * *